United States Patent [19]

Wang

[11] Patent Number: 5,825,944
[45] Date of Patent: Oct. 20, 1998

[54] BLOCK SELECTION REVIEW AND EDITING SYSTEM

[75] Inventor: Shin-Ywan Wang, Tustin, Calif.

[73] Assignee: Canon Kabushiki Kaisha, Tokyo, Japan

[21] Appl. No.: 834,856

[22] Filed: Apr. 10, 1997

Related U.S. Application Data

[63] Continuation of Ser. No. 361,240, Dec. 21, 1994, abandoned.

[51] Int. Cl.⁶ ..................................................... G06K 9/00
[52] U.S. Cl. ............................................ 382/309; 382/226
[58] Field of Search .................................... 382/100, 113, 382/135, 137, 138, 171, 173, 180, 181, 190, 209, 217, 224, 270, 282, 283, 284, 285, 276, 278, 307, 309, 311, 312, 225, 228, 166, 160, 156, 159, 227, 226; 364/468.14; 705/29; 707/515; 358/450, 453, 464; 706/10, 20

[56] References Cited

U.S. PATENT DOCUMENTS

| | | | |
|---|---|---|---|
| 3,755,780 | 8/1973 | Sammon et al. | 340/146.3 AC |
| 4,611,347 | 9/1986 | Netravali et al. | 382/205 |
| 4,764,867 | 8/1988 | Hess | 364/200 |
| 4,815,029 | 3/1989 | Barker et al. | 364/900 |
| 4,862,376 | 8/1989 | Ferriter et al. | 364/468 |
| 4,905,185 | 2/1990 | Sakai | 364/900 |
| 4,907,285 | 3/1990 | Nakano et al. | 382/48 |
| 4,975,977 | 12/1990 | Kurosu et al. | 382/46 |
| 5,140,676 | 8/1992 | Langelaan | 395/145 |
| 5,185,813 | 2/1993 | Tsujimoto | 382/9 |
| 5,204,916 | 4/1993 | Hamilton, Jr. et al. | 382/41 |
| 5,235,653 | 8/1993 | Nakano et al. | 382/61 |
| 5,251,268 | 10/1993 | Colley et al. | 382/14 |
| 5,257,328 | 10/1993 | Shimizu | 382/61 |
| 5,267,333 | 11/1993 | Aono et al. | 382/56 |
| 5,313,572 | 5/1994 | Yamamoto et al. | 395/145 |
| 5,315,671 | 5/1994 | Higuchi | 382/57 |
| 5,325,445 | 6/1994 | Herbert | 382/38 |

FOREIGN PATENT DOCUMENTS

| | | |
|---|---|---|
| 0325417A3 | 7/1989 | European Pat. Off. ........ G06F 15/62 |
| 0361737 | 4/1990 | European Pat. Off. .......... G06F 9/44 |
| 0489301 | 6/1992 | European Pat. Off. ...... G11B 27/031 |
| 0501753 | 9/1992 | European Pat. Off. ...... G06F 15/419 |
| 0528631 | 2/1993 | European Pat. Off. ........ G06F 15/72 |
| 0647921 | 4/1995 | European Pat. Off. ........ G06T 11/00 |
| WO94/22101 | 9/1994 | WIPO ............................ G06F 15/72 |

OTHER PUBLICATIONS

Tsujimoto, et al., "Understanding Multi–articled Documents," 10th Int'l Conf. on Pattern Recognition, IEEE, vol. 1, Jun. 16–21, 1990, pp. 551–556.

*Primary Examiner*—Leo H. Boudreau
*Assistant Examiner*—Bijan Tadayon
*Attorney, Agent, or Firm*—Fitzpatrick, Cella, Harper & Scinto

[57] ABSTRACT

A system for editing the hierarchical tree structure which is created by a block selection system to correspond to a block template which represents a document image, wherein the hierarchical tree structure includes a plurality of nodes, each of which represents a block of document image data in the block template of a document image and contains document feature data defining features of the block of image data. The system operates to download from memory the hierarchical tree structure, generate and display a block template representing a document image corresponding to the hierarchical tree structure in memory, select a block of document image data to be edited in the displayed block template, edit a feature of the selected block of image data and update the document feature data in a node corresponding to the selected block of image data. The system determines whether any document feature data in any node has been affected by updated feature data, and, if so, document feature data in the affected nodes are appropriately altered to reflect the new features of corresponding blocks of image data.

26 Claims, 27 Drawing Sheets

BLOCK SELECTION REVIEW AND EDITING SYSTEM

This application is a continuation of application Ser. No. 08/361,240, filed Dec. 21, 1994, now abandoned.

BACKGROUND OF THE INVENTION

1. Field Of The Invention

The present invention relates to a system for reviewing and editing results of a block selection operation performed on a document image. More particularly, the present invention relates to a system for editing a hierarchical tree structure which has been created as a result of performing a block selection operation on a document image.

2. Incorporation By Reference

U.S. applications Ser. No. 07/873,012, "Method And Apparatus For Character Recognition", Ser. No. 08/171,720, "Method And Apparatus For Selecting Text And/Or Non-Text Blocks In A Stored Document", and Ser. No. 08/338,781 "Page Analysis System", by Shin-Ywan Wang, are incorporated herein by reference.

3. Description Of The Related Art

Recently developed block selection techniques, such as the techniques described in U.S. Pat. application Ser. Nos. 07/873,012 and 08/171,720, automatically analyze document images in order to distinguish between different types of image data within the document image. The result of such a block selection technique is used to determine the type of subsequent processing to be performed on the image, such as optical character recognition (OCR), data compression, data routing, etc. For example, image data which is designated as text data will be subjected to OCR processing while data which is designated as picture data would not be subjected to OCR processing. As a result, the different types of image data can be input and automatically processed without an operator's intervention.

An example of how a block selection technique operates will be discussed below with respect to FIGS. 24–26. FIG. 24 shows a page of a representative document. The document page 2401 is arranged in a two-column format. The page includes a title 2402, a horizontal line 2414, text areas 2404, 2405, and 2409 which include lines of text data, halftone picture area 2407 which includes a graphic image which is non-text, table block 2410 which includes text information, framed area 2406, halftone picture area 2411 accompanied by caption data 2416, and picture area 2412 and 2415 accompanied by caption data 2417.

According to the block selection techniques described in U.S. Pat. application Ser. Nos. 07/873,012 and 08/171,720, the disclosures of which are hereby incorporated by reference, each area of document page 2401 is designated in accordance with the type of image data obtained therein and image data is then segmented based on the designation. As the block selection program processes the document image, a hierarchical tree structure is created as shown in FIG. 25.

As shown in FIG. 25, hierarchical tree structure 2501 contains a plurality of nodes which represent segmented blocks of image data. Each node of the tree contains feature data which defines the features of each block of image data in the processed document image. For example, the feature data may include block location data, size data, attribute data (image type, such as text, picture, table, etc.), sub-attribute data, and child node and parent node pointers. In the present invention, child (or "descendant") nodes represent blocks which exist entirely within a larger block. Child nodes are depicted in the hierarchical tree structure as a node branching from a parent node, such as node 2521 which branches from parent node 2510. In addition to the feature data described above, a node which represents a text block may also contain feature data defining the block's reading orientation and reading order.

Once hierarchical tree structure 2501 has been created, it is stored in memory. Upon receiving a request to process the image data in the document image, hierarchical tree structure 2501 is retrieved from memory and image data which has been blocked together is processed according to the feature data stored in its corresponding node.

In addition to using the hierarchical tree structure to process image data of a document image, the hierarchical tree structure is used to generate and display a comprehensible format of document image 2401 on display 2600 as shown in FIG. 26. As a result, block template 2601 of the document image is generated and displayed to the user on display 2600 based on the feature data stored in the hierarchical tree structure shown in FIG. 25.

The block template of the document image directly reflects the structure of the hierarchical tree as well as the feature data stored in each node of the hierarchical tree structure. The feature data in the node is utilized to generate the block outline, location, and size. In addition, feature data in each node is used to identify the type of image data contained within the block and, if appropriate, reading order and reading orientation. For example, as shown in FIG. 26, block template 2601 includes text blocks 2602, 2604, 2605 and 2609 each of which correspond to nodes 2502, 2504, 2505, and 2509, respectively. As shown, each text block includes feature data which designate the block as text and also define the block's reading order and reading orientation. Similarly, horizontal line block 2614, table block 2610, frame block 2606, halftone picture blocks 2607 and 2611, and picture block 2612 (each of which correspond to nodes 2514, 2510, 2506, 2507, 2511 and 2512, respectively), include feature data which designate the type of image data in the block.

Accordingly, when a block template of a document image is displayed to the user, the user sees a comprehensible format of how the document image has been processed by the block selection program. As a result, the user can readily determine whether the block selection program has operated correctly and whether the image data will be properly processed.

In the foregoing block selection techniques, difficulties have been encountered. That is, erroneous designation of image data results, thereby creating problems when subjecting designated image data to the wrong type of image processing. For example, text data which should be grouped into separate blocks may be grouped as a single block, or table data which contains text data may be designated as a picture block instead of a text block. In the foregoing examples, the errors in grouping and classifying the image data will erroneously determine the processing technique to which image data is subjected, thereby resulting in improper processing.

Another difficulty encountered with the block selection techniques described above occurs when a user desires to alter the type of processing to which designated image data within a document image is subjected. Conventionally, once the block selection operation has been performed on a document image, any editing of the resulting hierarchical tree structure is quite complex and time-consuming.

There is therefore a need to edit blocks of image data created by an automatic block selection operation so as to modify the blocks themselves or the feature data which defines the characteristics of the blocks.

SUMMARY OF THE INVENTION

It is an object of the present invention to provide a system which can edit blocks of image data and the feature data associated therewith. Preferably, editing takes place in the displayed block template of the document image and the editing program automatically updates feature data in the hierarchical tree structure in accordance with the editing operation.

In one aspect of the invention, the present invention provides a system in which a hierarchical tree structure of a block template of a document image can be edited. According to the invention, in a block selection system having a hierarchical tree structure which includes a plurality of nodes, each of which represents a block of image data in the block template of a document image and contains feature data defining features of the block of image data, there is a system for editing the hierarchical tree structure. The system operates to download from memory the hierarchical tree structure, generate and display a block template of a document image corresponding to the hierarchical tree structure in memory, select a block of image data to be edited in the block template of a document image, edit the selected block of image data and update the feature data in a node corresponding to the selected block of image data. The system determines whether the remaining feature data in the node has been affected by updated feature data, and, if so, the remaining feature data is altered to appropriately reflect the new feature of the selected block of image data. The system also determines whether any of the features of the remaining blocks have been affected by the new feature of the selected block of image data, and, if so, feature data in the affected nodes are appropriately altered to reflect the new features of the corresponding blocks of image data.

In another aspect of the invention, a block editing system operates to retrieve from memory a hierarchical tree structure, generate and display a block template of a document image corresponding to the hierarchical tree structure, select a block of image data within the block template of a document image to be edited, select a new reading order, a reading orientation, or an attribute for the selected block of image data, and update the feature data defining the characteristic in a node corresponding to the selected block of image data so as to conform to the selected characteristic.

In another aspect of the invention, a block editing system operates to retrieve a hierarchical tree structure from memory, generate and display a block template of a document image corresponding to the stored hierarchical tree structure, display the block template of a document image, select at least two blocks within the document image to be merged together into a new block of image data, delete each node in the hierarchical tree structure corresponding to the previously merged blocks, redisplay the block template of a document image having the at least two blocks of image data merged into the new block of image data, and subject the new block of image data to a block selection operation so as to create a corresponding node in the hierarchical tree structure and to store feature data in the created node.

In another aspect of the present invention, the block selection system operates to retrieve a hierarchical tree structure from memory, generate and display a block template of a document image corresponding to the stored hierarchical tree structure, select a block of image data within the block template of the document image, release the image data within the selected block, delete a node corresponding to the selected block in the hierarchical tree structure, manually block the released image data into one or more blocks of image data, perform a block selection operation on the one or more blocks so as to create a node and feature data corresponding to each of the one or more blocks of image data, and update the hierarchical tree structure.

In another aspect of the present invention, the block selection system operates to retrieve a hierarchical tree structure from memory, select a node in the hierarchical tree structure to edit, edit feature data in the selected node, update unedited feature data in the node to conform with the feature data edited in the edit step, and update at least one other node in the hierarchical tree structure in the case the edited feature data in the selected node affects feature data in the at least one other node.

In another aspect of the present invention, the block selection system operates to retrieve a hierarchial tree structure from memory, generate and display a hierarchical block template of a document image corresponding to the stored hierarchial tree structure, select a block of image data to be edited within the hierarchial block template of the document image, edit the selected block of image data, update feature data in a node corresponding to the edited block of image data, and re-display the edited hierarchial block template of the document image.

In another aspect of the present invention, the block selection system operates to retrieve a hierarchical tree structure from memory, generate and display a block template of a document image corresponding to the stored hierarchical tree structure, select a block of image data within the document image to be split into at least two blocks of image data, designate a portion to be split from the selected block of image data, split the block of image data into at least two blocks of image data, delete a node in the hierarchical tree structure corresponding to the selected block of image data, redisplay the block template of the document image having the block of image data split into at least two blocks of image data, and subject the at least two blocks of image data to block selection so as to create corresponding nodes in the hierarchical tree structure and to store feature data in the created nodes.

This brief summary of the invention has been provided so that the nature of the invention may be understood quickly. A more complete understanding of the invention and its advantages may be obtained by reference to the following detailed description in connection with the appended drawings.

BRIEF DESCRIPTION OF THE DRAWINGS

FIG. 3, comprising

DETAILED DESCRIPTION OF THE PREFERRED EMBODIMENT

Figure 1:
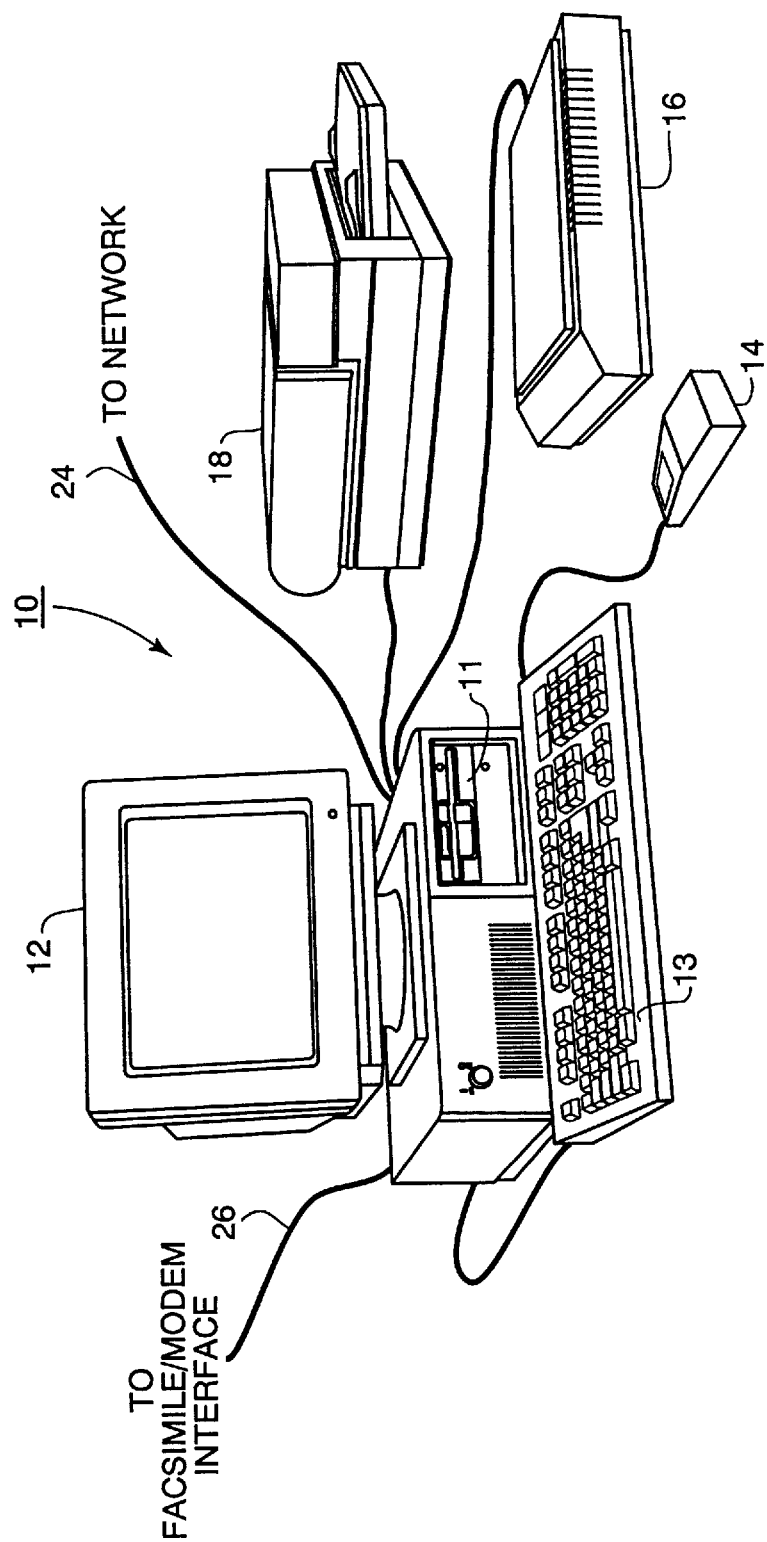
FIG. 1 is a perspective view showing the outward appearance of an apparatus according to the present invention.

FIG. 1 is a view showing the outward appearance of a representative embodiment of the invention. Shown in FIG. 1 is computing equipment 10 such as a MacIntosh or an IBM PC or PC-compatible computer having a windowing environment such as Microsoft Windows®. Provided with computing equipment 10 is display screen 12, such as a color monitor, keyboard 13 for entering user commands, and pointing device 14, such as a mouse, for pointing to and for manipulating objects displayed on screen 12.

Computing equipment 10 includes a mass storage device such as computer disk 11 for storing data files which include document image files, in either compressed or uncompressed format, and for storing application program files which can include at least one block selection program and a block selection editor program. Also stored on disk 11 are various hierarchial tree structure data for each document image which has been subjected to a block selection program. Computer disk drive 11 contains other information processing programs which contain stored program instructions by which computing equipment 10 manipulates the data files and presents data in those files to an operator via display screen 12.

Document image data is input by scanner 16 which scans documents or other images and provides bit-mapped images of those documents to computing equipment 10. The document image data may also be input into computing equipment 10 from a variety of other sources such as network interface 24 or other external devices via facsimile/modem interface 26.

Printer 18 is provided for outputting processed document images.

It should be understood that, although a programmable general purpose computer arrangement is shown in FIG. 1, a dedicated or stand-alone computer or other type of data processing equipment can be used to practice the invention.

Figure 2:
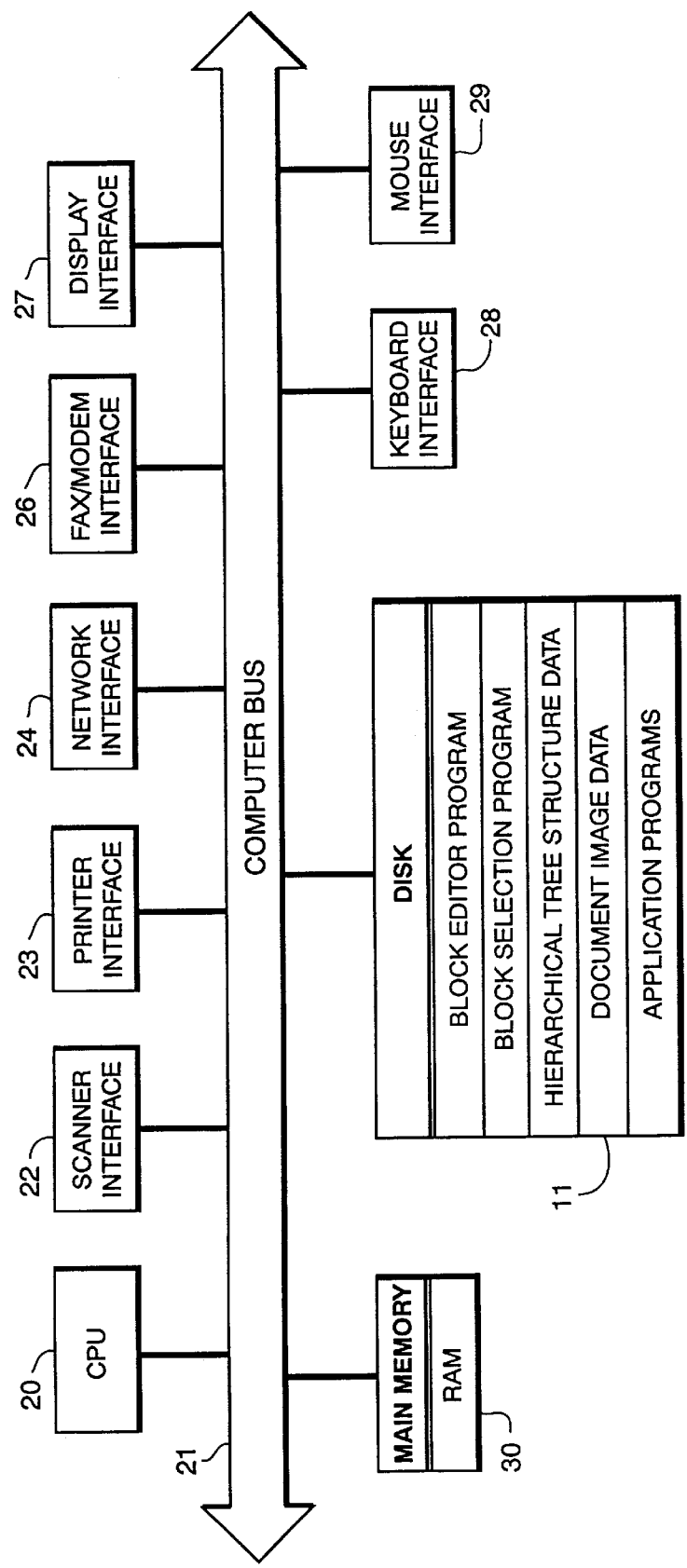
FIG. 2 is a block diagram of the FIG. 1 apparatus.

FIG. 2 is a detailed block diagram showing the internal construction of computing equipment 10. As shown in FIG. 2, computing equipment 10 includes a central processing unit (CPU) 20 interfaced with computer bus 21. Also interfaced with computer bus 21 is scanner interface 22, printer interface 23, network interface 24, fax/modem interface 26, display interface 27, keyboard interface 28, mouse interface 29, main memory 30, and disk 11.

Main memory 30 interfaces with computer bus 21 so as to provide random access memory storage for use by CPU 20 while executing stored program instructions such as the block selection program or the block selection editing program. More specifically, CPU 20 loads those programs from disk 11 into main memory 30 and executes those stored programs out of main memory 30.

In accordance with the operator instructions, stored application programs provide for image processing and manipulating of data. For example, a desktop publishing program such as Wordperfect for Windows® may be activated by an operator to create, manipulate, and view documents. Likewise, a block selection operation may be activated to analyze the various types of image data in an input document image.

Figure 3A:
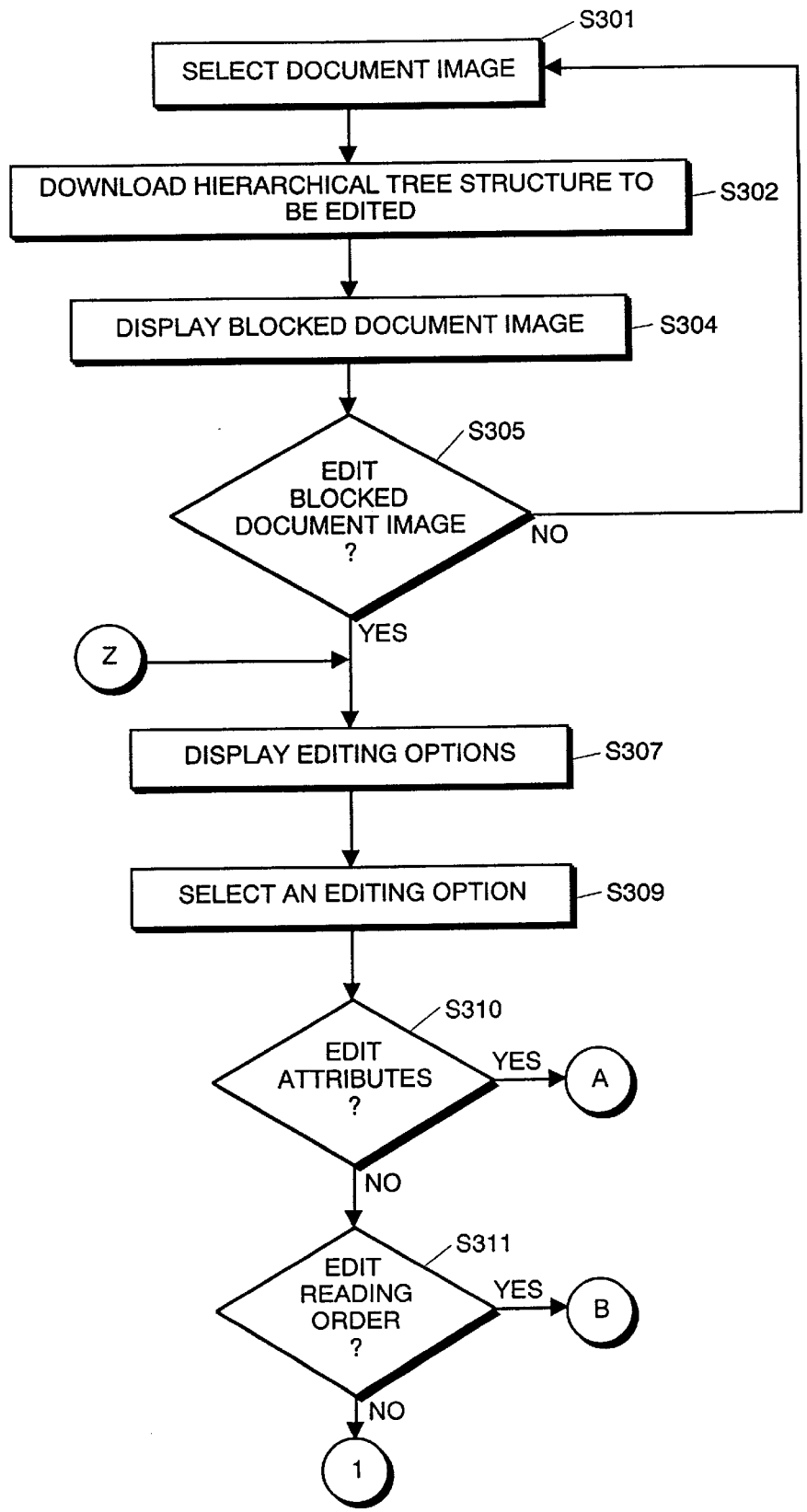
FIGS. 3A and 3B, is a flow diagram describing an overview of the block editing system according to the present invention.
Figure 3B:
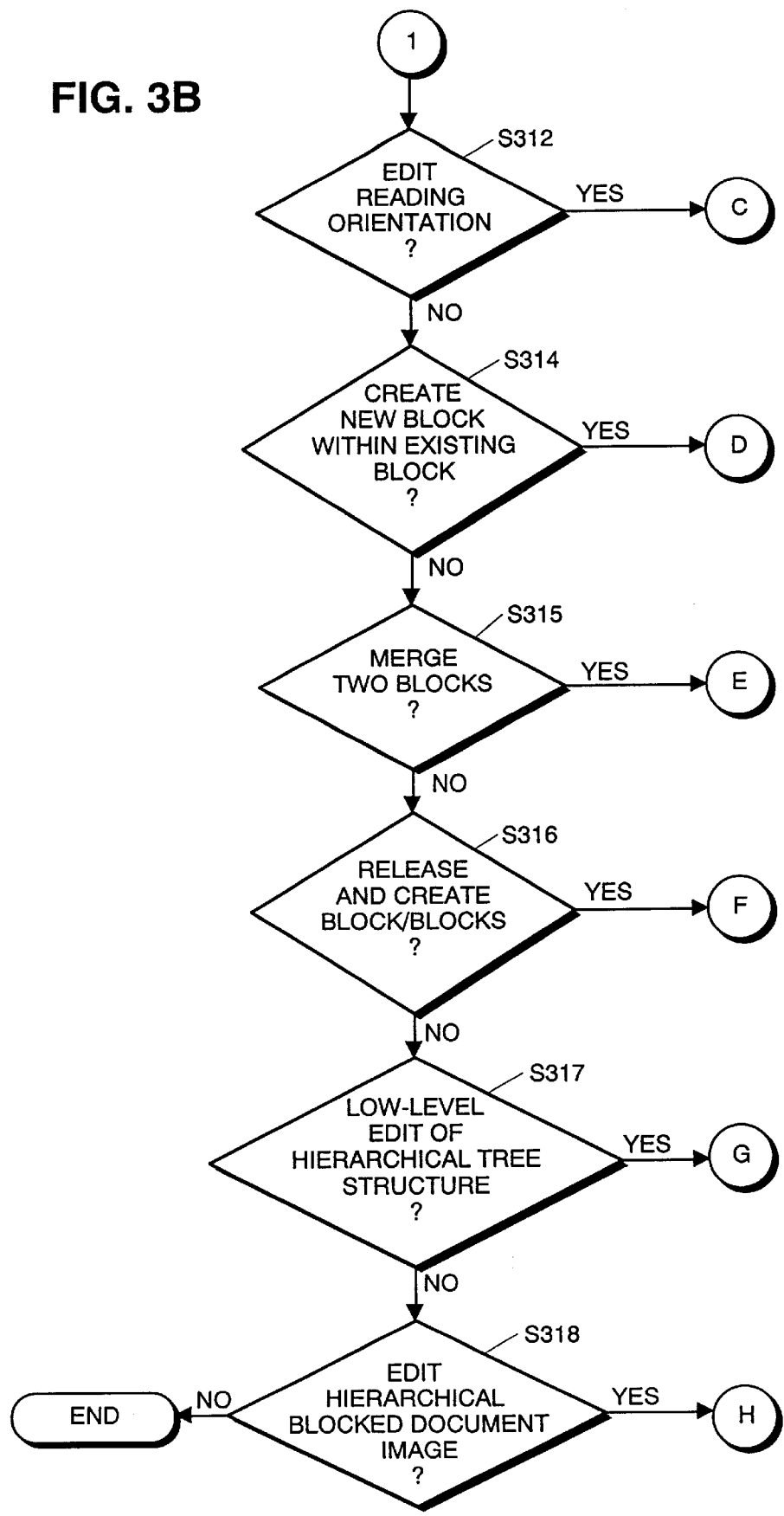

FIG. 3, comprising FIGS. 3A and 3B, is a flow diagram describing an overview of the block editing system.

A preferred method for selecting a hierarchical tree structure and editing a block template of a document image will be described with respect to a windowing environment in which the user utilizes a mouse to select operations from menus and pull-down menus displayed in a window.

Thus, in step S301, the user selects a hierarchical tree structure to be edited from a displayed menu. In step S302, the selected file which contains the hierarchical tree structure is downloaded from disk 11 and stored in main memory 30. For the purpose of discussion, the hierarchical tree structure consist of text data, table data, halftone picture data, picture data, frame data, and line data.

In step S304, a block template of a document image corresponding to the selected hierarchical tree structure is generated from the retrieved hierarchical tree structure and is displayed to the user. As discussed previously, each block is displayed to the user with at least the attribute feature which is defined by the feature data contained in its corresponding node. In step S305, the block selection editing program queries the user to determine whether editing is desired. If the user chooses not to edit the hierarchical tree structure, flow returns to step S301, at which point the user can select a different hierarchical tree structure to edit. On the other hand, if the user elects to edit the hierarchical tree structure, then flow advances to step S307 in which editing operation options are displayed to the user.

In step S309, the user selects the editing operation to be performed, for example, the user could select to edit an attribute of a block (step S310), a reading order of a block (step S311), or an orientation of a block (step S312). The user may also choose other editing operations which permit the user to redefine blocks by creating a block within a pre-existing block or splitting the pre-existing block into two blocks (step S314), merging two blocks (step S315), releasing and creating one or more blocks of image data from a preexisting block (step S316), directly editing the hierarchical tree structure (step S317), or editing the hierarchial block template of the document image (step S318).

Preferably, each of the above editing operations, which will be discussed in greater detail below, are performed directly on the displayed block template of a document image (with the exception of step S317) and feature data in the corresponding node/nodes are automatically updated as a result of the edit operations.

It is noted that the following editing operations are merely examples of the types of editing operations which can be performed with the present invention.

Attribute Editing

Figure 4:
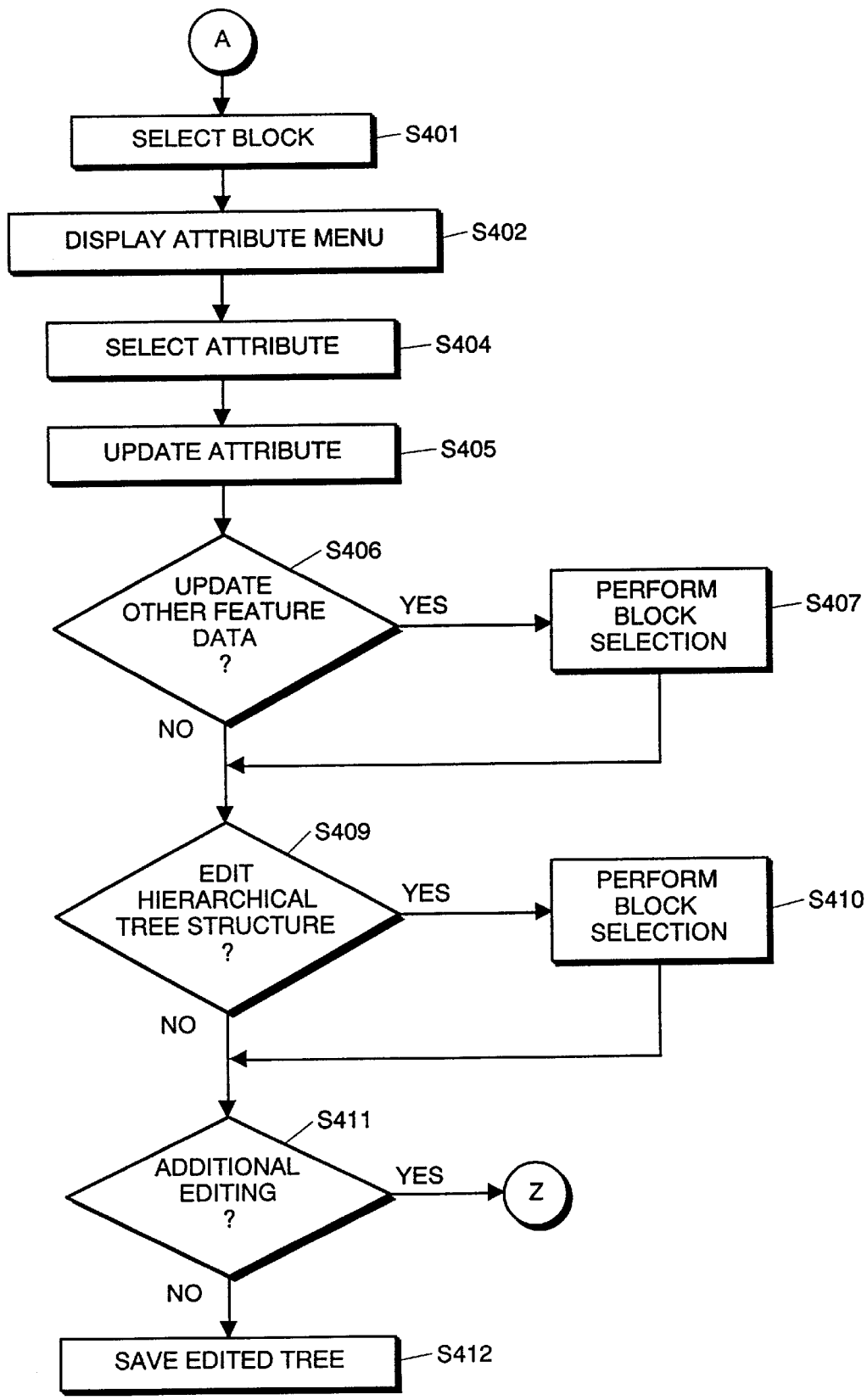
FIG. 4 is a flow diagram describing the method of editing the attribute of a block of image data.

FIG. 4 is a detailed flow diagram showing processing in the event that editing of a block's attribute is selected (step S310). In the present invention, a block attribute defines the type of image data within the block created by the block selection technique. For example, the block attribute may define text image, picture image, etc. In some situations, it may be desirable to change the attribute set by the block selection operation, for example, in the case the attribute has been incorrectly designated or in the case the user wants the block of image data subjected to a different type of image processing rather than the type designated by the attribute set by a block selection operation.

Thus, in step S401, the user, utilizing mouse 14, selects a particular block within the displayed block template of a document image to be edited. Upon selecting the block, flow advances to step S402 in which a menu of selectable attributes is displayed. The menu of selectable attributes may consist of a list of attributes which are arranged in lowest to highest priority or least to most logical selection. In step S404, the user selects the attribute to be assigned to the block by placing the cursor on the desired attribute in the menu.

Figure 5A:
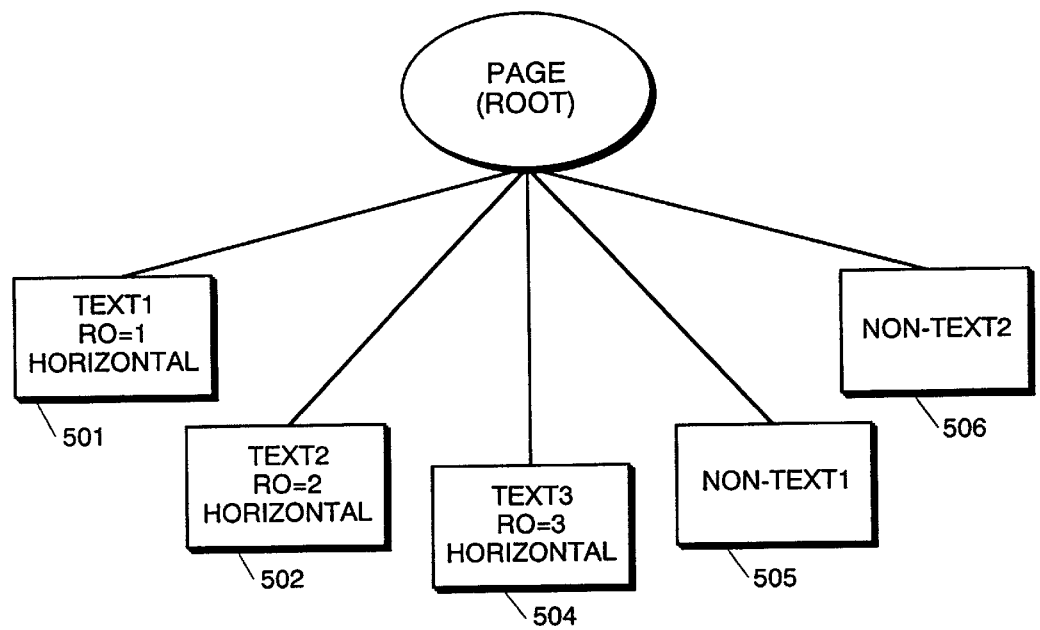
FIGS. 5A and 5B are representational views of a hierarchial tree structure before and after editing the attribute of a block of image data.
Figure 5B:
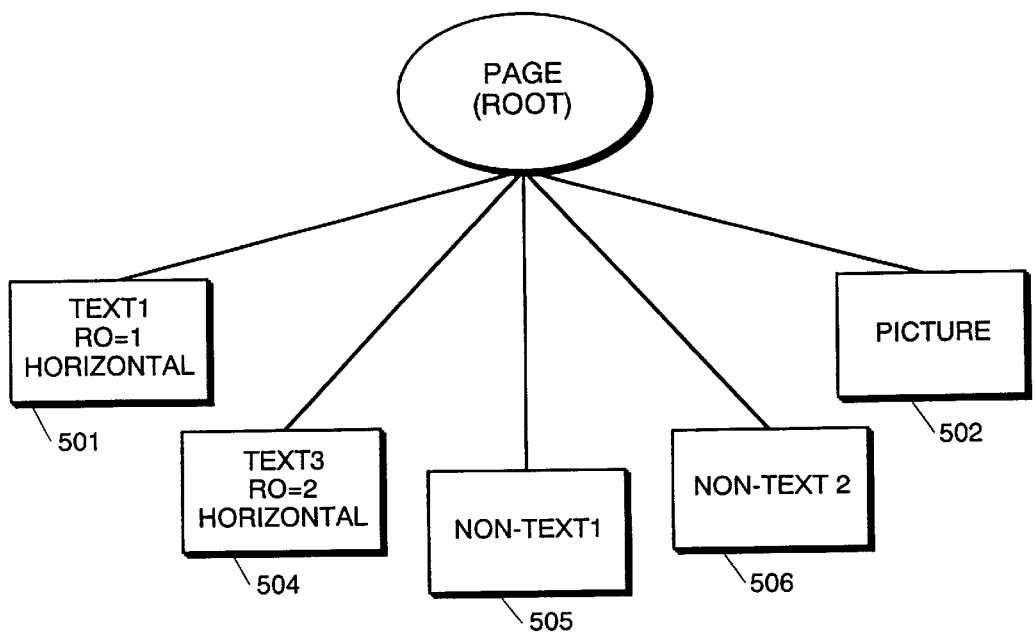

In step S405, feature data contained in the node representing the block is updated in accordance with the selected attribute. The editing of the attribute is reflected in the hierarchical tree structure of the block template of the document image. For example, as shown in FIG. 5A, there is illustrated a hierarchical tree structure of a block template of a document image. As shown in FIG. 5B, the user has edited the attribute in node 502 from a text designation to a picture designation, and the feature data contained in node 502 is updated to reflect the change.

After the attribute has been edited, flow advances to step S406, at which point the block selection editing program determines whether the editing of the attribute of node 502 requires the remaining feature data within node 502 to be updated. For example, since the unedited version of node 502 represented text data, and the edited version of node 502 represents picture data, feature data in node 502 must be updated in order to delete reading order and reading orientation and to create a sub-attribute which indicates whether the picture block is in joint-solid-line style. In this case, flow advances to step S407, so that various steps of block selection can be applied to the edited block. On the other hand, in step S406, if the edited block does not require further editing, flow proceeds to step S409.

In step S409, the block selection editing program determines whether remaining nodes in the hierarchical tree structure require editing due to the edited attribute of node 502. For example, the reading order of the text block represented by node 504 must be edited from 3 to 2 due to the edited attribute. In addition, the remaining nodes must be rearranged within the tree structure so that the nodes representing the text blocks are rearranged sequentially according to reading order. Accordingly, step S410 performs various steps of block selection in order to edit remaining nodes of the hierarchical tree structure. As shown in FIG. 5B, the reading order of node 504 has been edited from 3 to 2, and edited node 502 has been moved to the far right of the hierarchical tree structure. However, if the hierarchical tree structure does not need to be edited, flow advances to step S411.

In step S411, the user is queried as to whether any additional editing operations should be performed. If additional editing is required, flow returns to step S307. If no further editing is desired, then flow proceeds to step S412 in which the edited hierarchical tree structure is saved to computer disk 11.

Reading Order Editing

Figure 6:
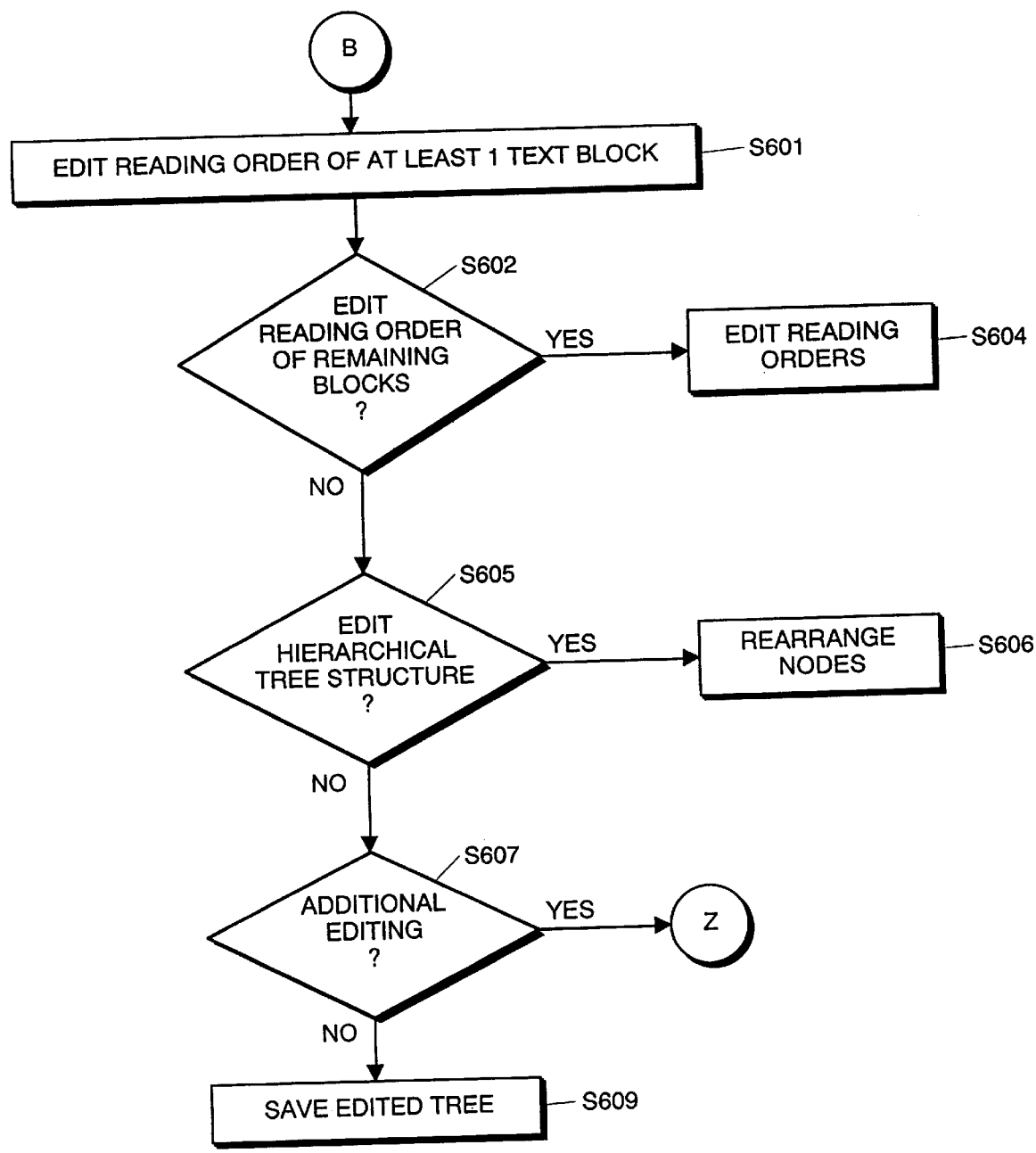
FIG. 6 is a flow diagram describing the method of editing the reading order of a block of image data.

FIG. 6 is a detailed flow diagram showing processing in the event that editing of a block's reading order is selected (step S311). The reading order determines the sequence in which text blocks in a document image are read. The determination of reading order is important in facilitating OCR processing of the text block. That is, in order for OCR processing to perform properly, the text blocks must be processed in the correct order. Using this editing feature, the user can edit a reading order of a text block in the case that reading orders of text blocks in a block template of a document image are incorrectly assigned by a block selection technique.

Figure 7A:
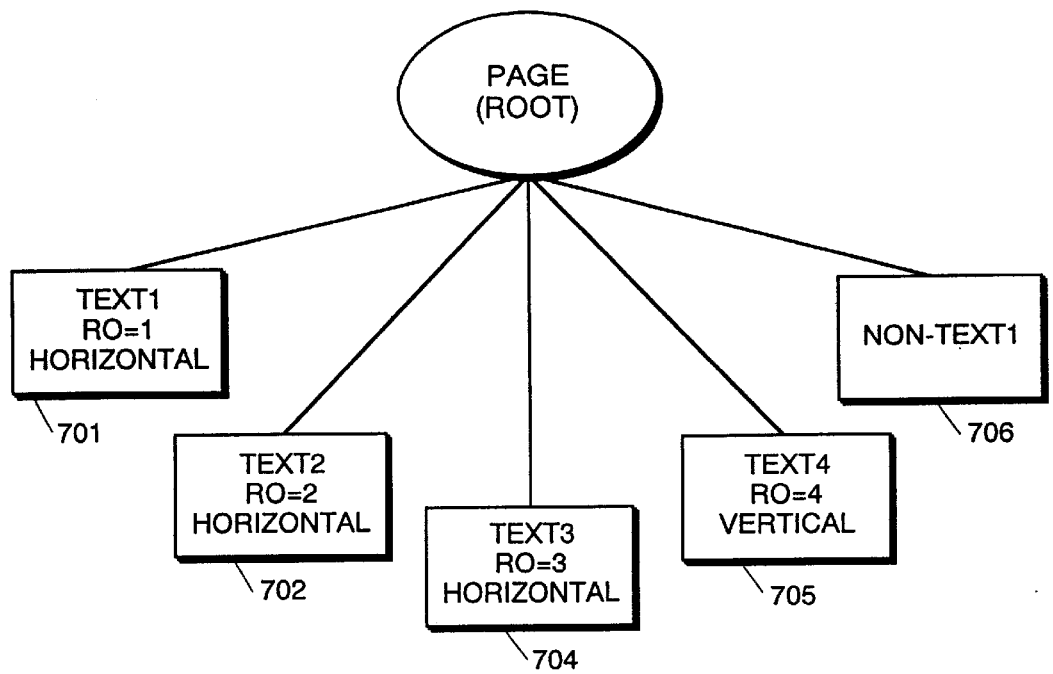
FIGS. 7A and 7B are representational views of a hierarchial tree structure before and after editing the reading order of a block of image data.
Figure 7B:
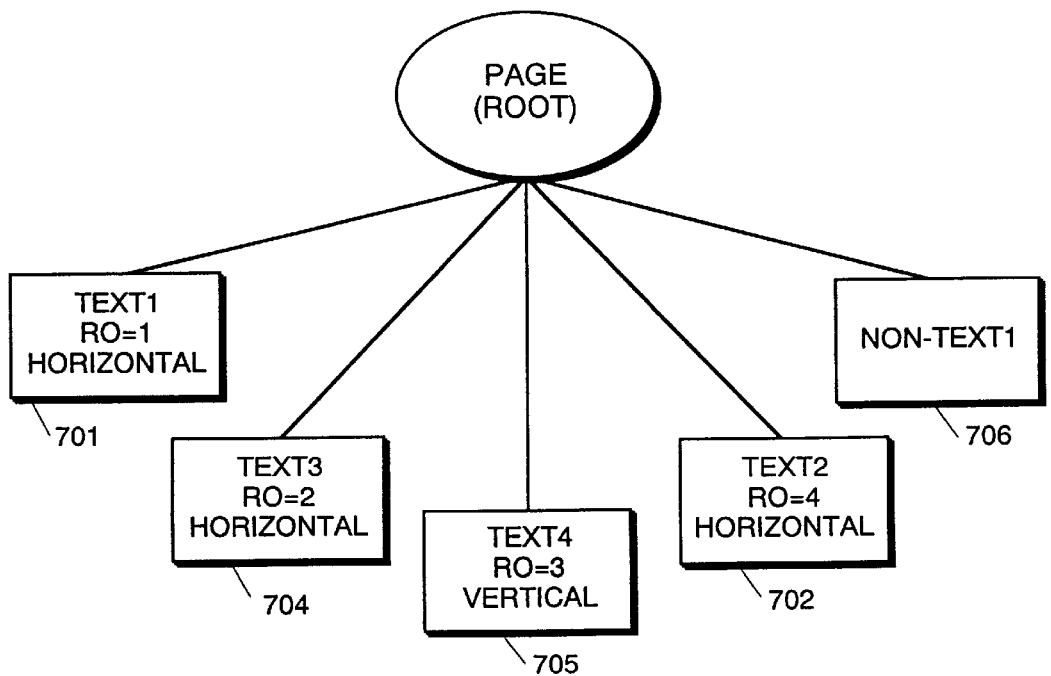

Thus, in step S601, the user selects and edits the reading order of at least one of the text blocks in the displayed document image. The feature data contained in the edited node representing the edited block is updated in accordance with the edited reading orders. For example, FIG. 7A and 7B show a hierarchical tree structure before and after editing a reading order. In the present example, the reading order of text block 2 has been edited from 2 to 4. Consequently, as shown in FIG. 7B, the feature data in node 702 defining the reading order of text block 2, is updated to reflect a new assigned reading order of 4.

Flow advances to step S602, in which the block selection editing program determines whether the reading orders of any of the remaining text blocks require editing because of the editing of node 702. If the reading order of any of the remaining blocks require editing, flow proceeds to step S604, in which the reading orders of the affected blocks are edited. For example, as shown in FIG. 7B, nodes 704 and 705 are edited to reflect a change in their reading order due to the editing of node 702. On the other hand, if no further editing is required, flow proceeds to step S605.

In step S605, the block selection editing program determines whether the hierarchical tree structure needs to be edited in accordance with the edited reading orders. The positions of the nodes representing the text blocks of a document image in the hierarchical tree structure is determined by their respective reading orders. Therefore, if the reading orders have been edited, the structure of the hierarchical tree will require editing. In this case, flow proceeds to step S606, in which the nodes are rearranged according to the new reading orders. For example, as shown in FIG. 7A and 7B, nodes 702, 704, and 705 have been rearranged in accordance with the edited reading orders. On the other hand, if the hierarchical tree structure does not need to be edited, flow proceeds to step S607.

In step S607, the user is queried as to whether any additional editing operations are desired. If additional editing is required, flow returns to step S307. However, if no further editing is required, flow proceeds to step S609 in which the edited hierarchical tree structure is saved to computer disk 11.

Reading Orientation Editing

Figure 8:
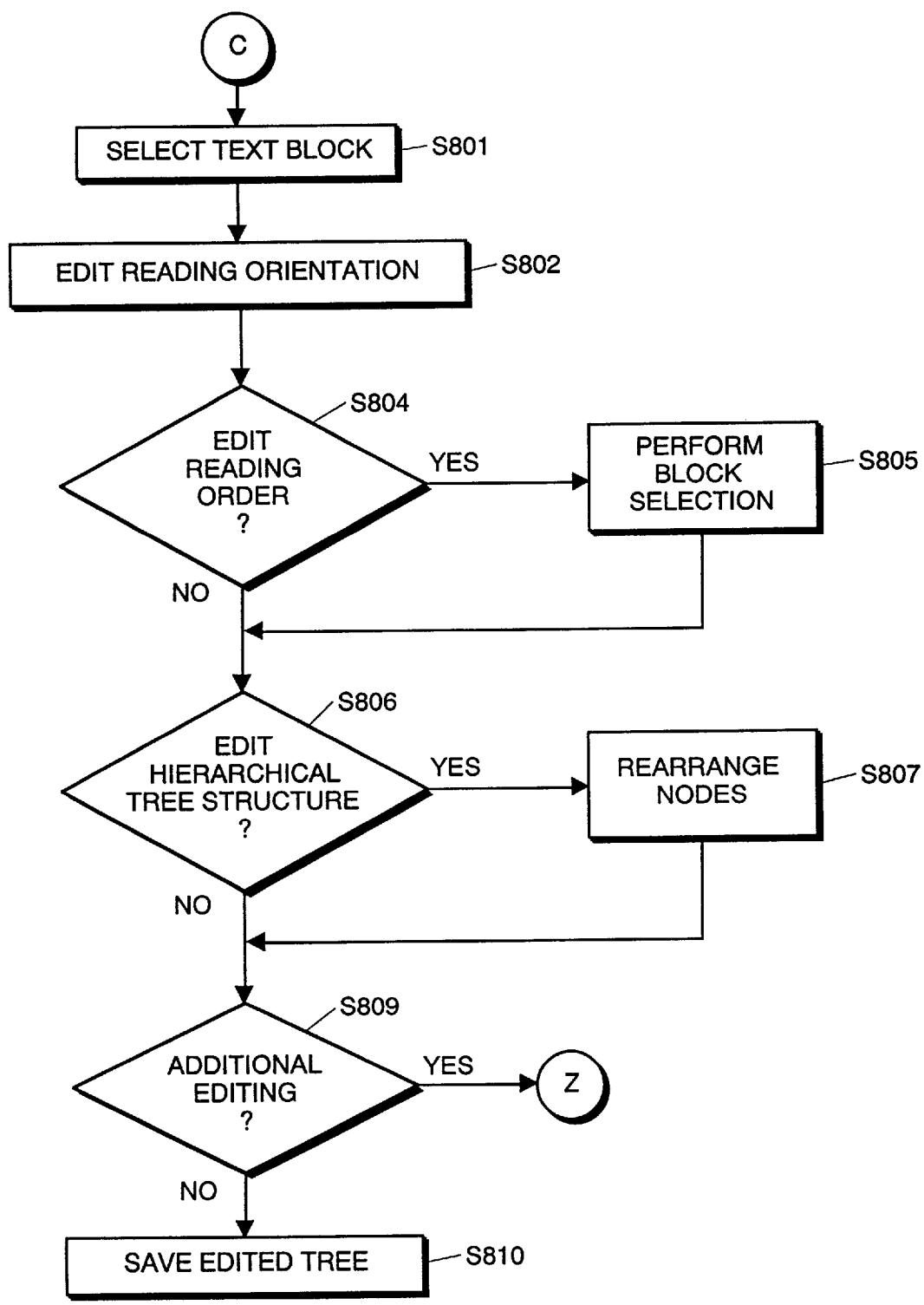
FIG. 8 is a flow diagram describing the method of editing the reading orientation of a block of image data.

FIG. 8 is a detailed flowchart showing processing in the event that editing of a block's reading orientation is selected (step S312). In step S312, a reading orientation of a text block is edited. For example, if the reading orientation of a text block is incorrectly assigned during character recognition, such as in the case of Japanese text, which is normally read in vertical columns, being assigned a horizontal reading orientation, the user can edit the reading orientation to appropriately reflect the reading orientation of the text. As a result, segmentation of line and character data can be correctly performed.

Figure 9A:
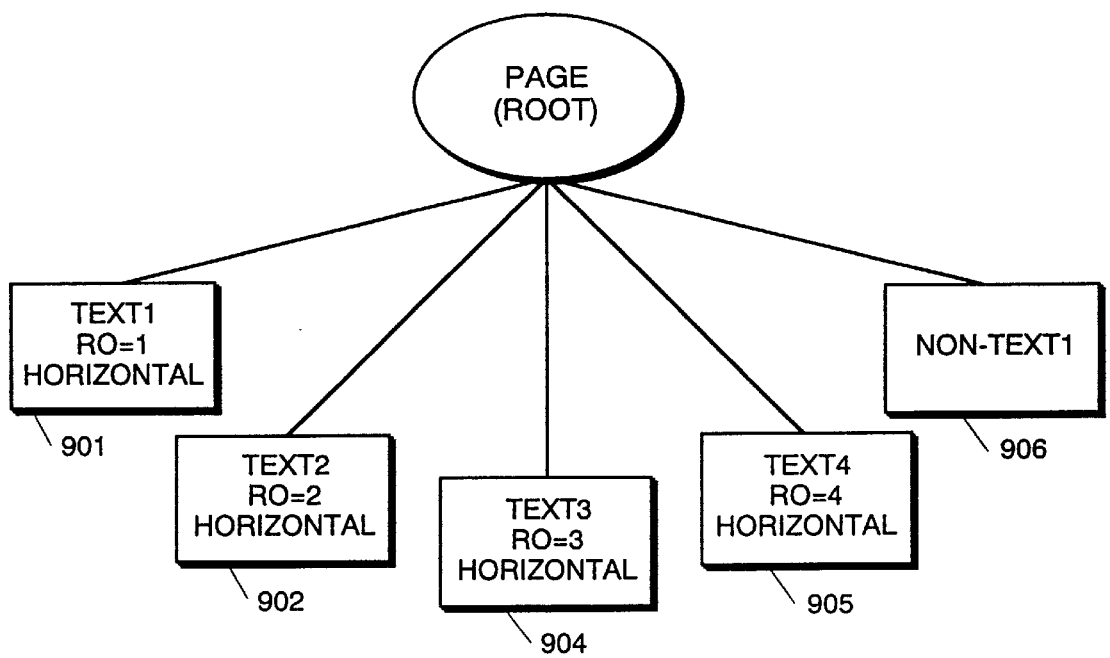
FIGS. 9A and 9B are representational views of a hierarchial tree structure before and after editing the reading orientation of a block of image data.
Figure 9B:
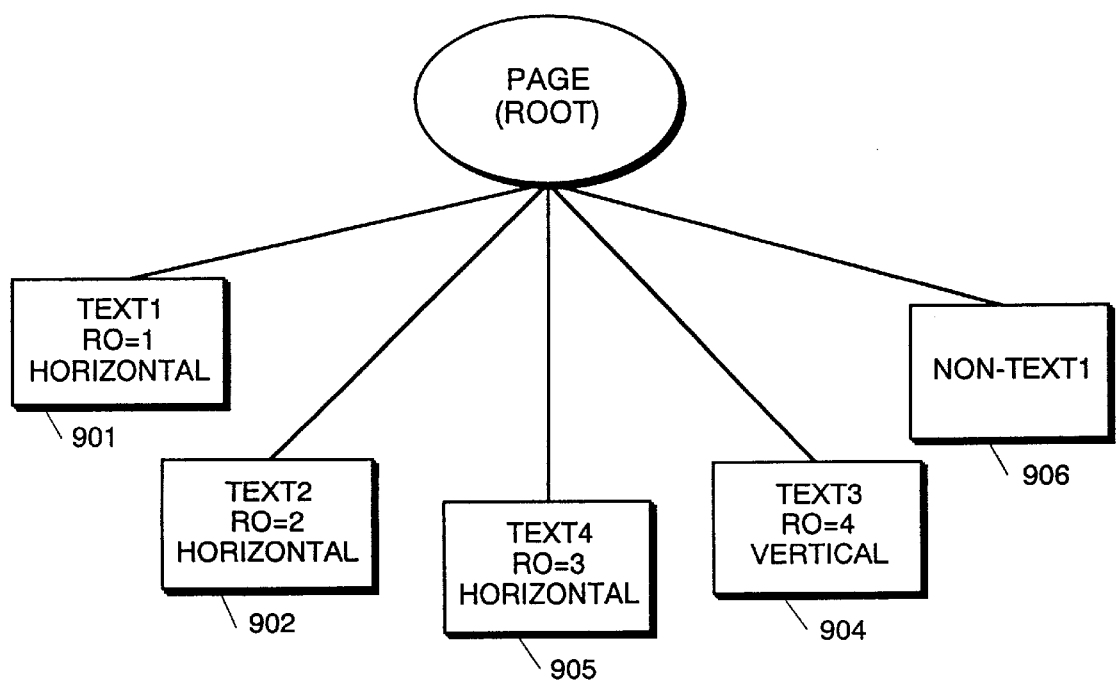

Thus, in step S801, the user selects the text block of the document image to be reoriented. In step S802, the reading orientation of the selected text block is changed and the feature data defining the reading orientation of the text block is updated. For example, FIGS. 9A and 9B show the hierarchical tree structure of a blocked document image before and after the reading orientation of a block has been edited. The reading orientation of text block 3, represented by node 904, has been selected for editing by the user.

In step S802, the text lines and the skew of the text block are reconfigured in accordance with block selection process steps.

In step S804, it is determined whether the reading order of the selected text block must be edited due to the edited reading orientation of the selected text block. If so, flow proceeds to step S805, in which the reading order of the selected text block is edited by applying various steps of block selection to the edited block. In accordance with this editing, the feature data representing the reading order of the selected block is updated. For example, as shown by FIGS. 9A and 9B, the feature data in node 904 which defines the reading order of text block 3 is updated from 3 to 4.

In step S807, the block selection editing program determines whether the feature data contained in the remaining nodes in the hierarchical tree structure requires updating due to the change in node 904. If so, the hierarchical tree structure is edited in step S809. For example, as shown in FIGS. 9A and 9B, the feature data representing the reading order in node 905 is updated from 4 to 3 due to the editing of the reading orientation of text block 3. In addition, the nodes in the hierarchical tree structure are rearranged in accordance with the updated reading order.

In step S810, the user is queried as to whether any additional editing operations are desired. If additional editing is requested, flow returns to step S304. On the other hand, if no further editing is required, flow advances to step S811 in which the edited tree structure is saved to computer disk 11.

Creating A Block From Within A Preexisting Block

Figure 10:
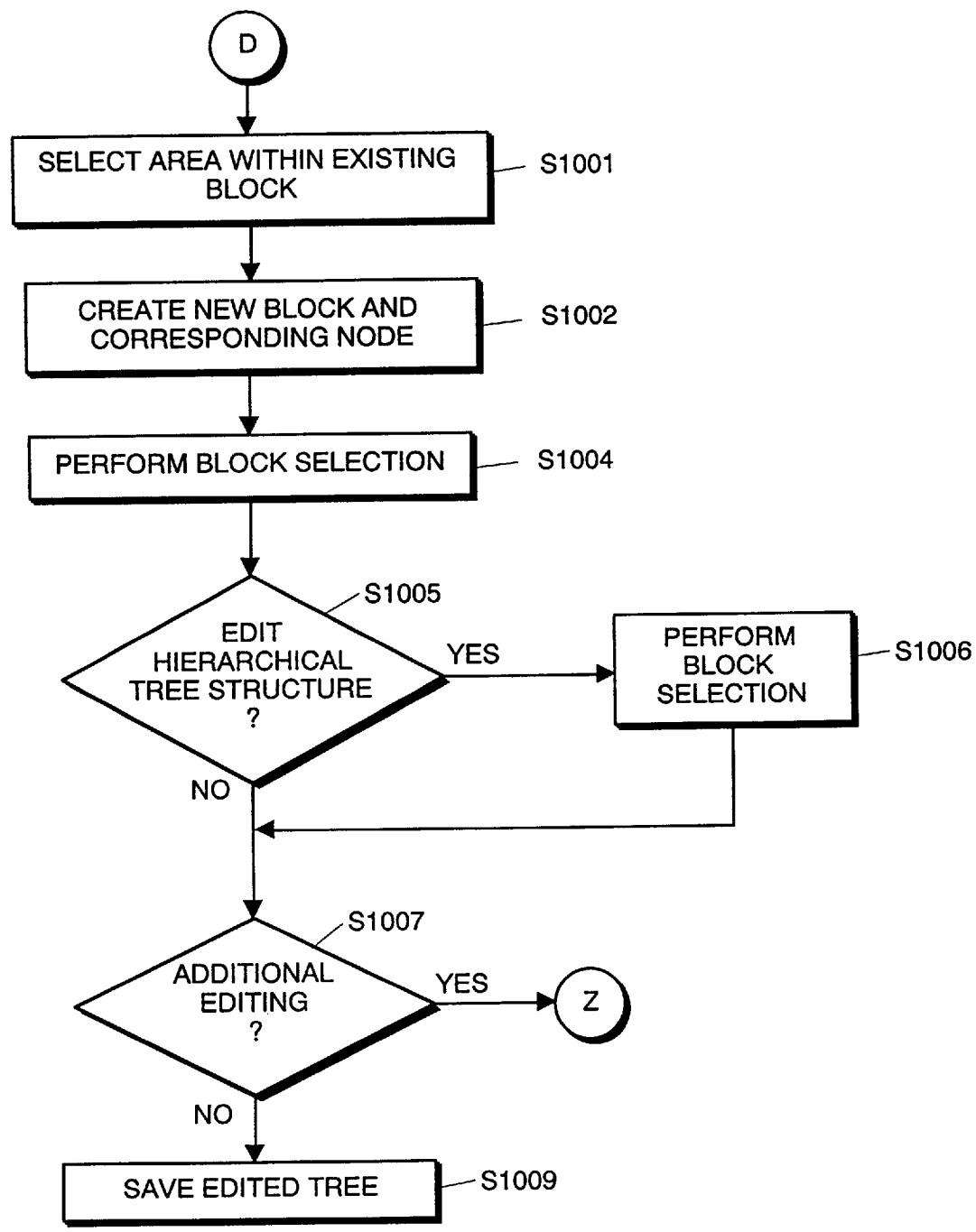
FIG. 10 is a flow diagram describing the method of creating a new block of image data from within an existing block of image data in a block template of a document image.

FIG. 10 is a detailed flow diagram showing processing in the event that creation of a block from within a preexisting block is selected (step S314). That is, the user may create a new block from within an existing block or split an existing block to create a new block if, for example, two different types of image data are contained within the block. By separating out a block within an existing block, the different types of image data can be subjected to the most appropriate type of processing.

Figure 11A:
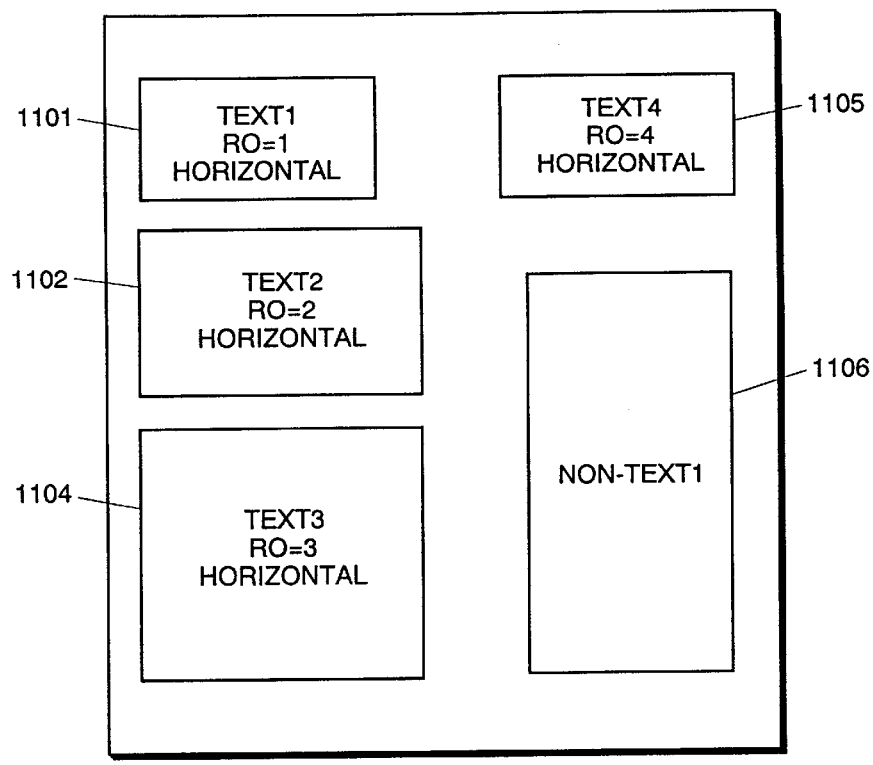
Figures 11A and 11B are representational views of a block template of a document image and its corresponding hierarchical tree structure before a new block of image data is created within an existing block of image data.
Figure 11B:
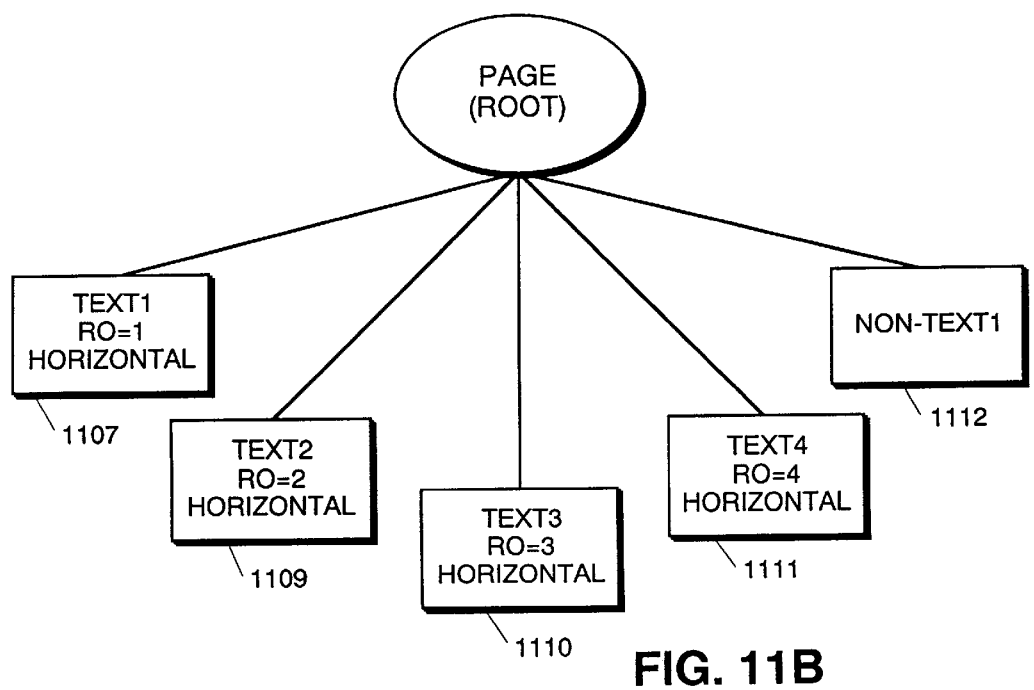
Figure 12A:
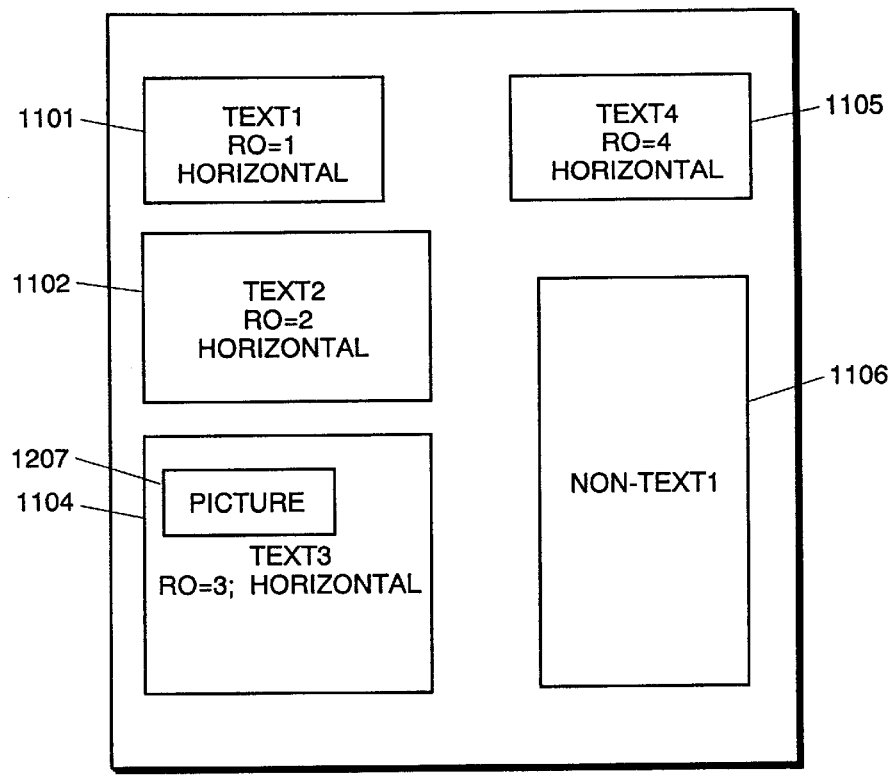
FIGS. 12A and 12B are representational views of a block template of a document image and its corresponding hierarchical tree structure after creating a new block of image data within an existing block of image data.
Figure 12B:
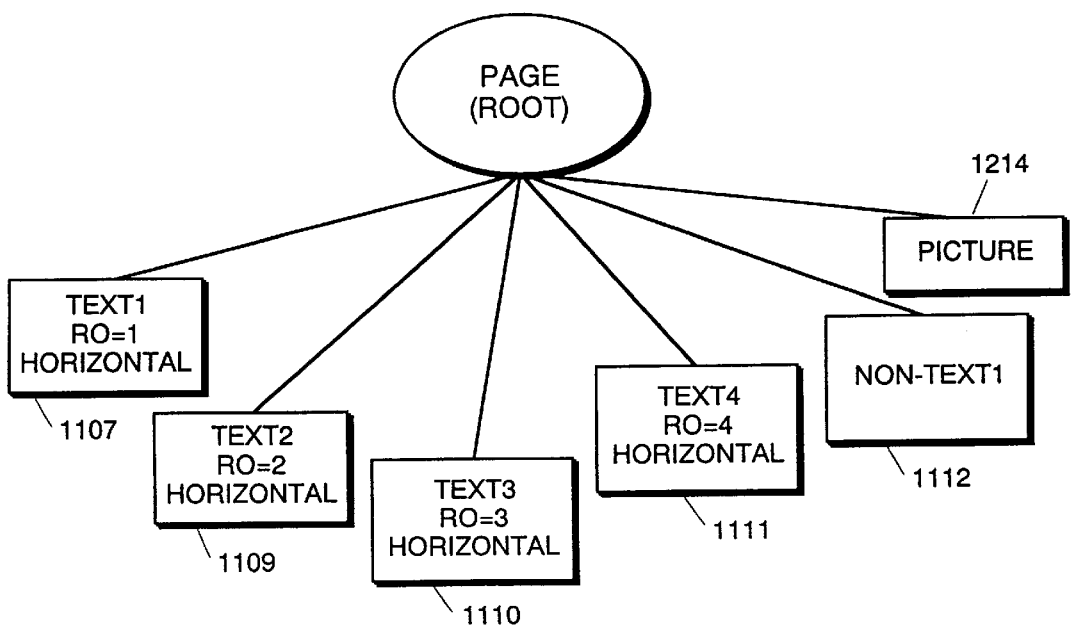

Thus, in step S1001, the user, utilizing mouse 14, selects a portion of a preexisting block to be separated out and blocked. As shown in FIGS. 11A and 12A, portion 1207 of block 1105 has been selected. In step S1002, and as shown in FIGS. 12A and 12B, new block 1207 and node 1214 are created. In the case that the portion of the existing block is formed by splitting the existing block, the new portion will be represented by a new node in the hierarchical tree in the same manner.

In step S1004, the newly created block 1207 is subjected to various process steps of block selection operation so as to classify the new block. In this manner, feature data is created and stored in node 1214. For example, as shown in FIG. 12B, the feature data in node 1214 has been updated to define a picture image.

In step S1005, the block selection editing program determines whether the hierarchical tree structure needs to be edited. For example, in step S1006, parent node 1111 is edited to include a pointer to child node 1214, and the remaining nodes remain unaltered.

In step S1007, the user is queried as to whether any additional editing operations should be performed. If additional editing is desired, flow returns to step S304. If not, flow proceeds to step S1009 in which the edited hierarchical tree structure is saved to disk 11.

Merging Two Blocks

Figure 13:
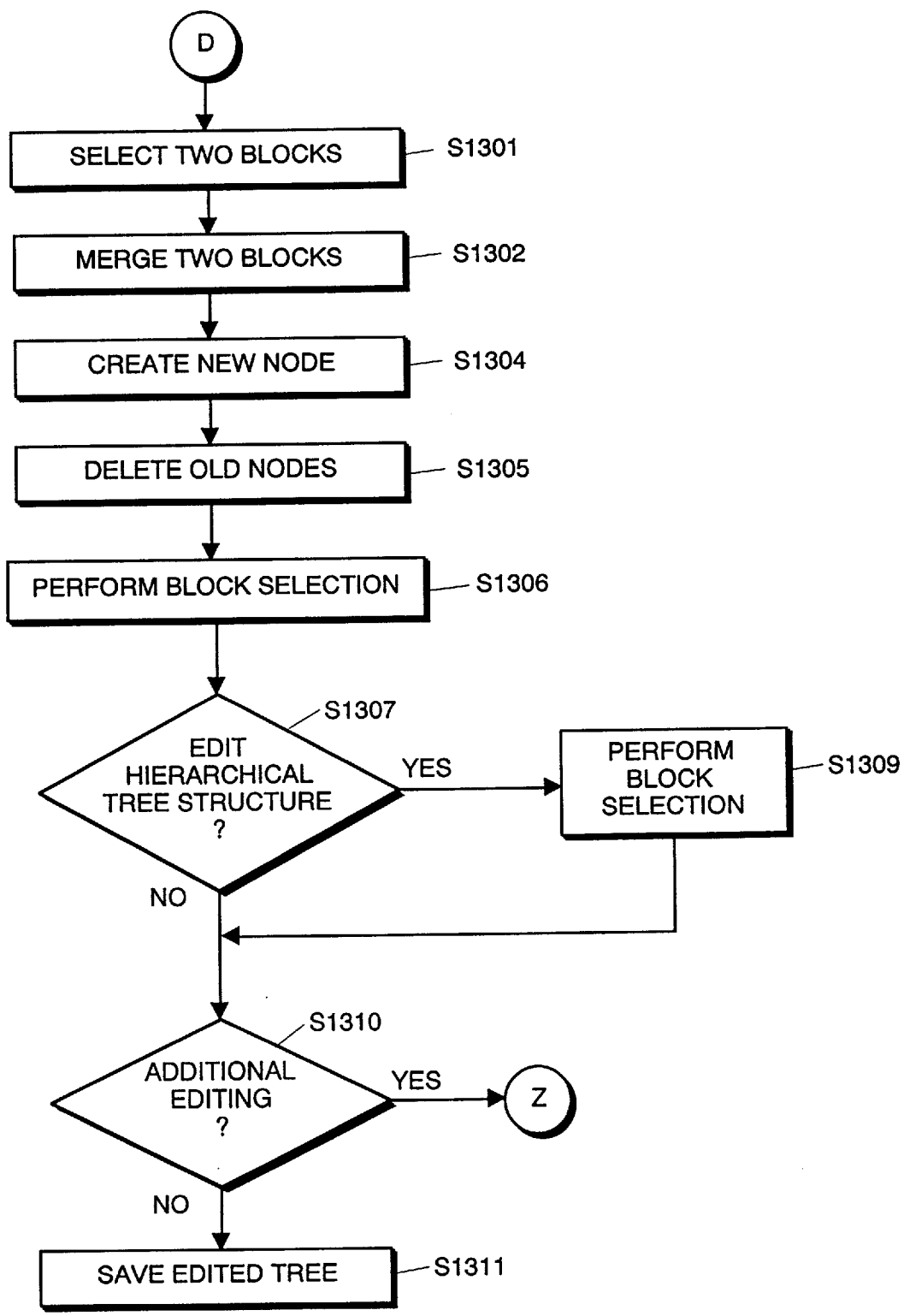
FIG. 13 is a flow diagram describing the method of merging two blocks of image data to form a new block of image data in a block template of a document image.

FIG. 13 is a detailed flow diagram showing processing in the event that an operation to merge two blocks is selected (step S315). Occasionally, after a block selection operation has been performed on a document image, two blocks which more appropriately should have been combined exist side by side in a block template of the document image. By merging the two blocks, the image data in the resulting new block will be processed as one image type.

Figure 14A:
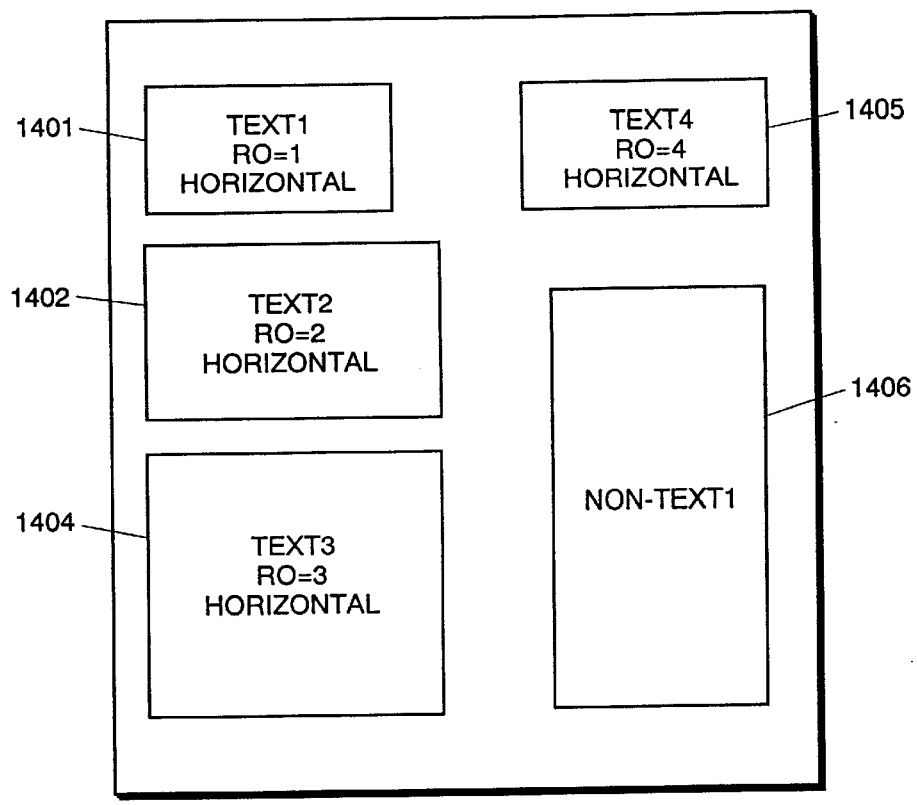
FIGS. 14A and 14B are representational views of a block template of a document image and its corresponding hierarchical tree structure before two blocks of image data are merged to form a new block of image data.
Figure 15A:
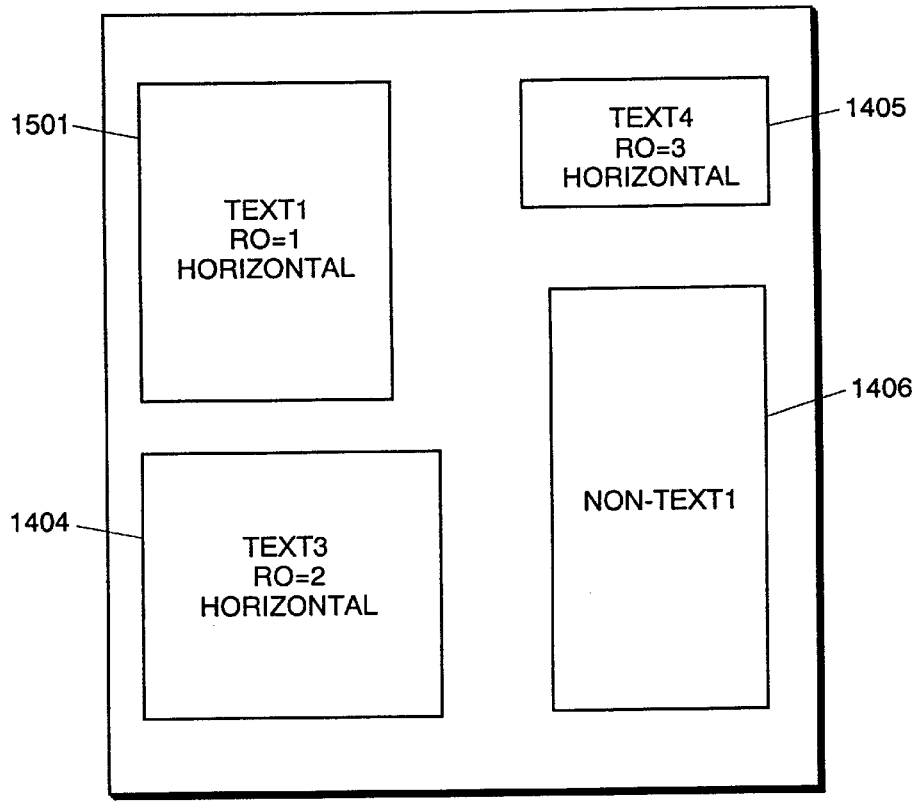
FIGS. 15A and 15B are representational views of a block template of a document image and its corresponding hierarchical tree structure after two blocks of image data have been merged to form a new block of image data.

Thus, in step S1301, the user selects two blocks from the block template of a document image which are to be merged to form a new block. In step S1302, the two blocks are merged in the block template of a document image. For example, as shown in FIG. 14A, blocks 1401 and 1402 have been selected to be merged, and, in FIG. 15A, the two blocks are merged to create new block 1501.

Figure 15B:
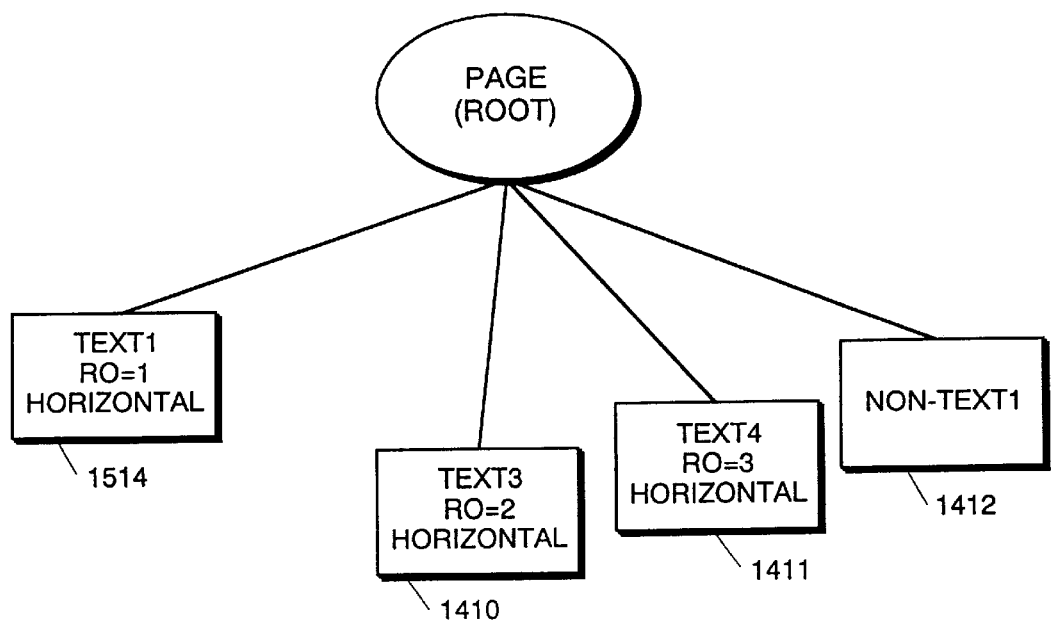

In step S1304, node 1514 is created in the hierarchical tree structure representing the block created by merging the two selected blocks. For example, node 1514 has been created to represent block 1501. In step S1305, the two nodes representing the merged blocks are deleted from the hierarchical tree structure. For example, nodes 1407 and 1409, representing blocks 1401 and 1402, have been deleted from the hierarchical tree structure as shown in FIG. 15B.

In step S1306, new block 1501 is subjected to various steps of a block selection operation and feature data defining characteristics of new block 1501 is created and stored in node 1514. For example, by applying block selection steps, feature data contained in node 1514 is created to define block 1501 as a text block with a reading order of 1 and having a horizontal reading orientation.

Figure 14B:
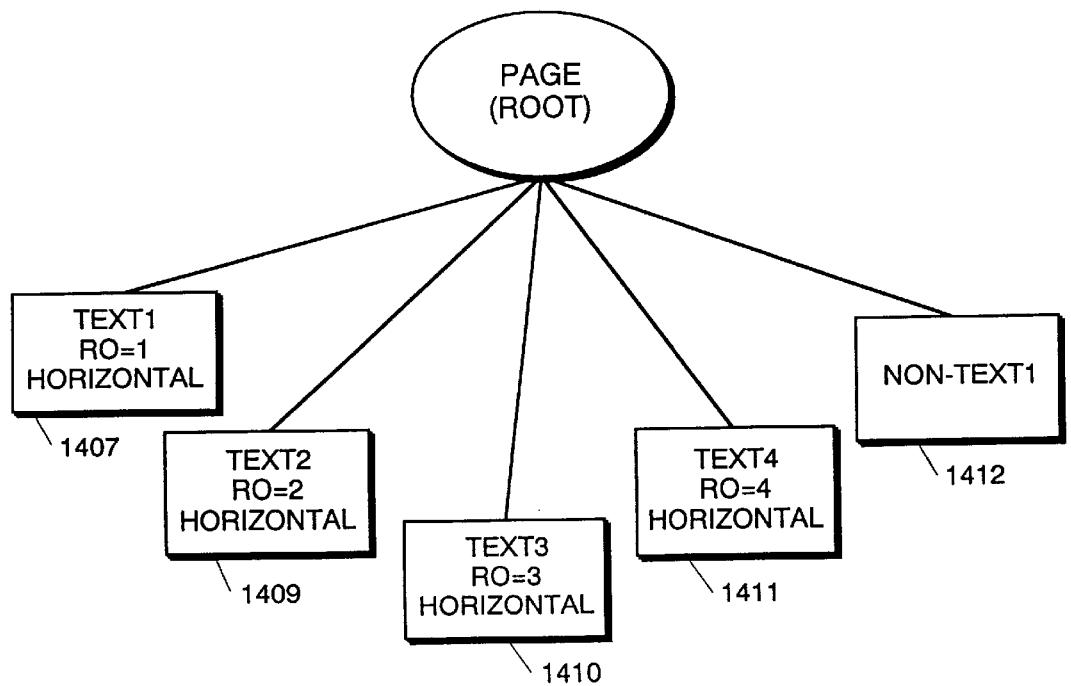

In step S1307, it is determined whether the hierarchical tree structure requires further editing in view of the merging of blocks 1401 and 1402. If so, flow advances to step S1309, in which the affected blocks of image data are subjected to block selection process steps so as to edit their status in accordance with the new block. As shown in FIGS. 14B and 15B, the reading order of text block 1404 is edited from 3 to 2. Similarly, the reading order of text block 1405, represented by node 1411 is edited from 4 to 3.

Finally, in step S1310, the user is queried as to whether any additional editing operations should be performed. If additional editing is desired, flow returns to step S304. On the other hand, if no further editing is required, flow proceeds to step S1311 in which the edited tree structure is saved to computer disk 11.

Releasing And Creating One Or More Blocks From An Existing Block

Figure 16:
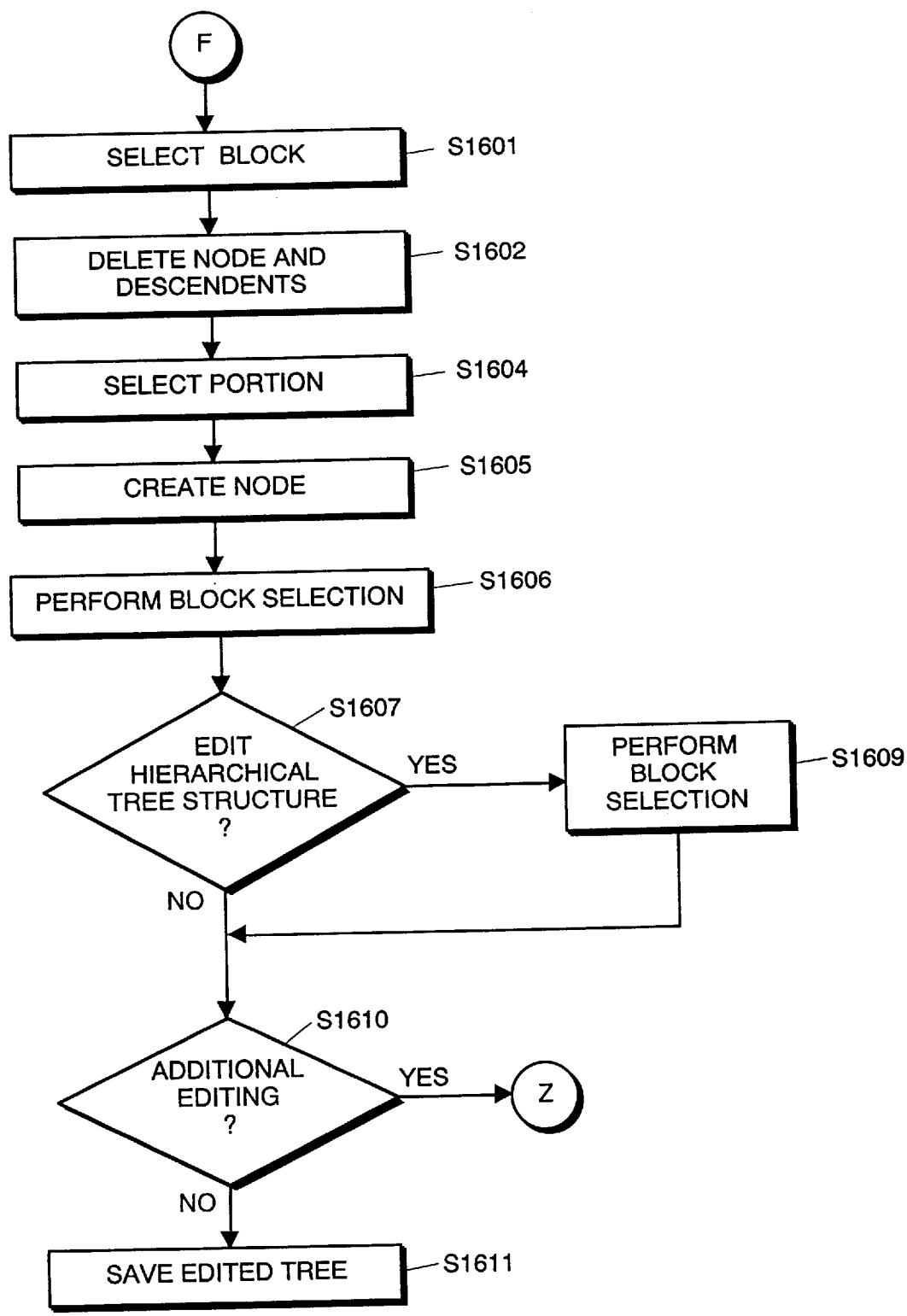
FIG. 16 is a flow diagram describing the method of releasing a block within a block template of a document image and creating one or more blocks from the image data.

FIG. 16 is a flow diagram showing processing in the event that releasing and creating one or more blocks from an existing block is selected (step S316). In this manner, erroneously combined image data or image data which the user desires to be processed differently can be subjected to various processing techniques.

Figure 17A:
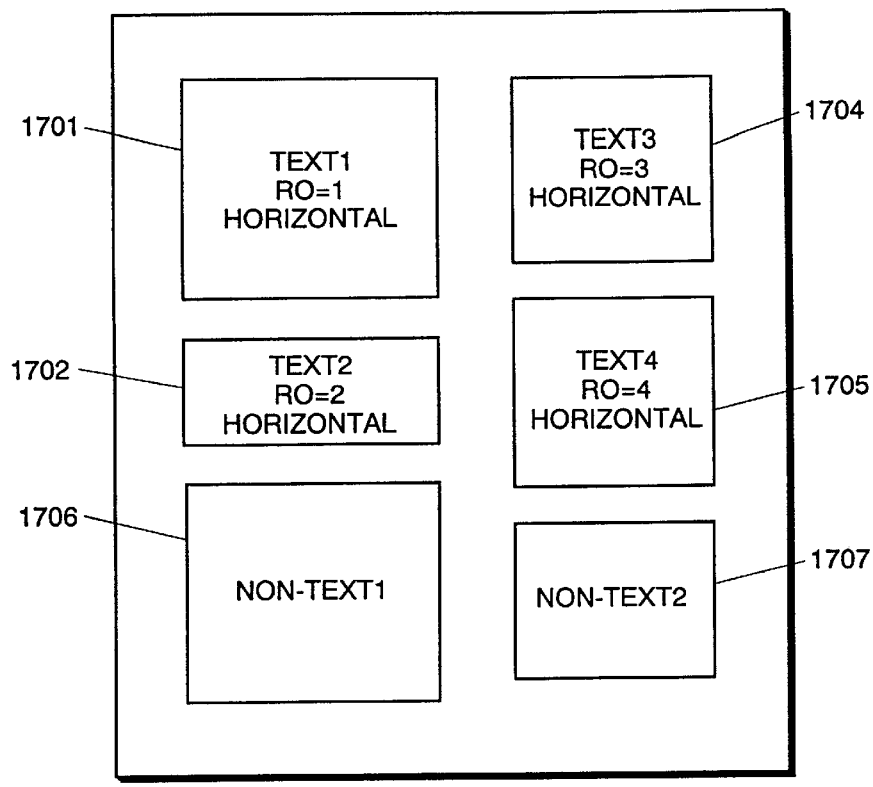
FIGS. 17A and 17B are representational views of a block template of a document image and its corresponding hierarchical tree structure before releasing and creating one or more blocks from the image within the document image.
Figure 17B:
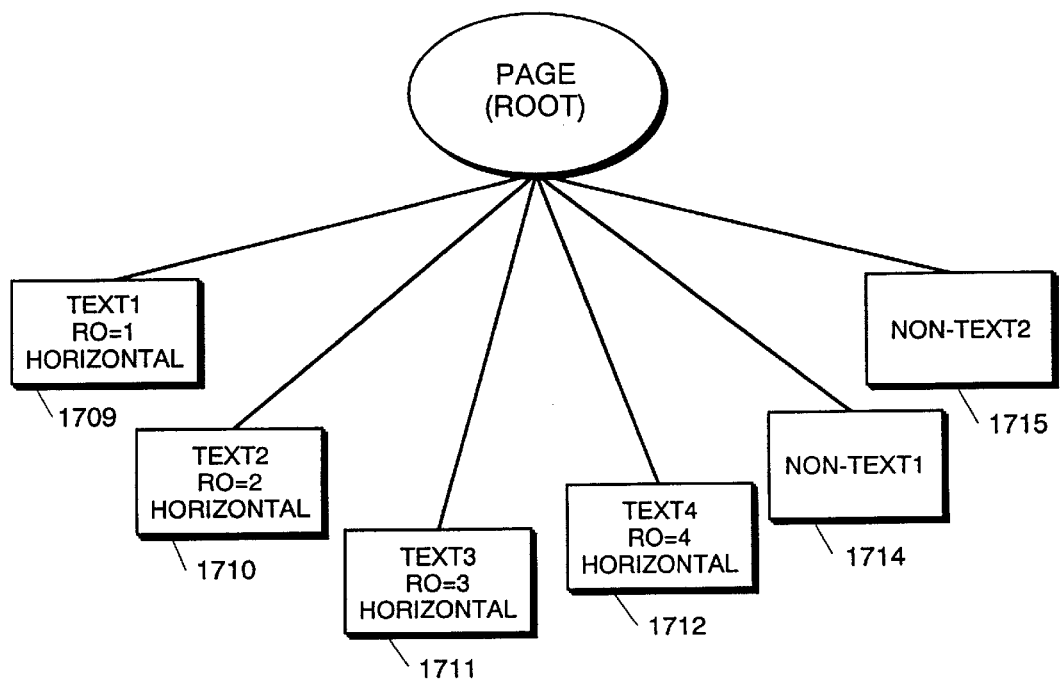
Figure 18A:
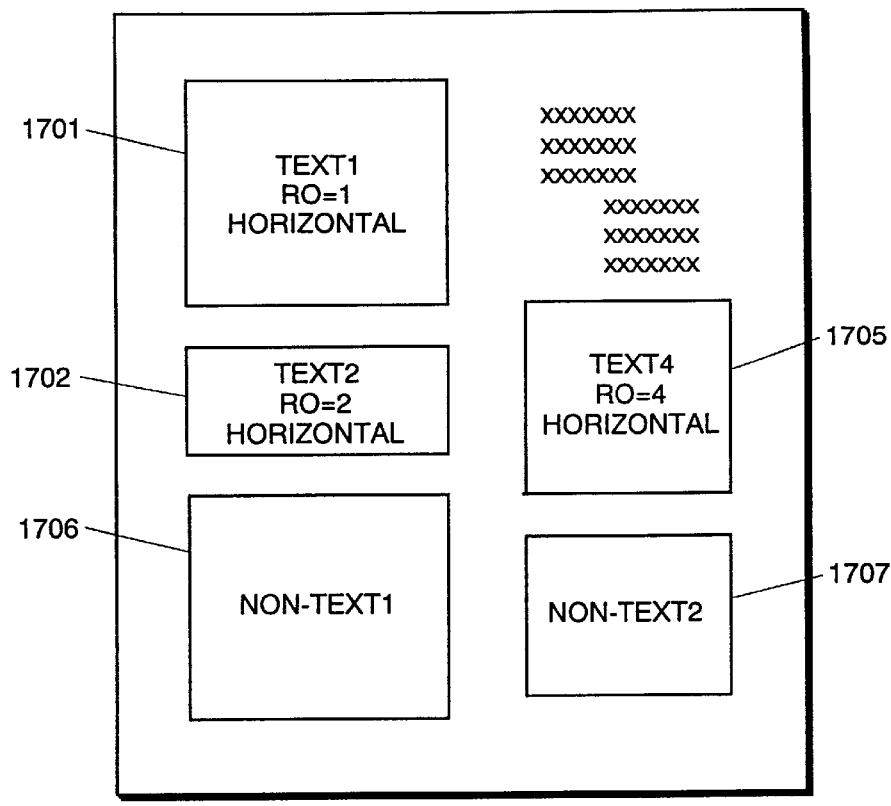
FIGS. 18A and 18B are representational views of a block template of a document image and its corresponding hierarchical tree structure after a block is released from the document image.
Figure 18B:
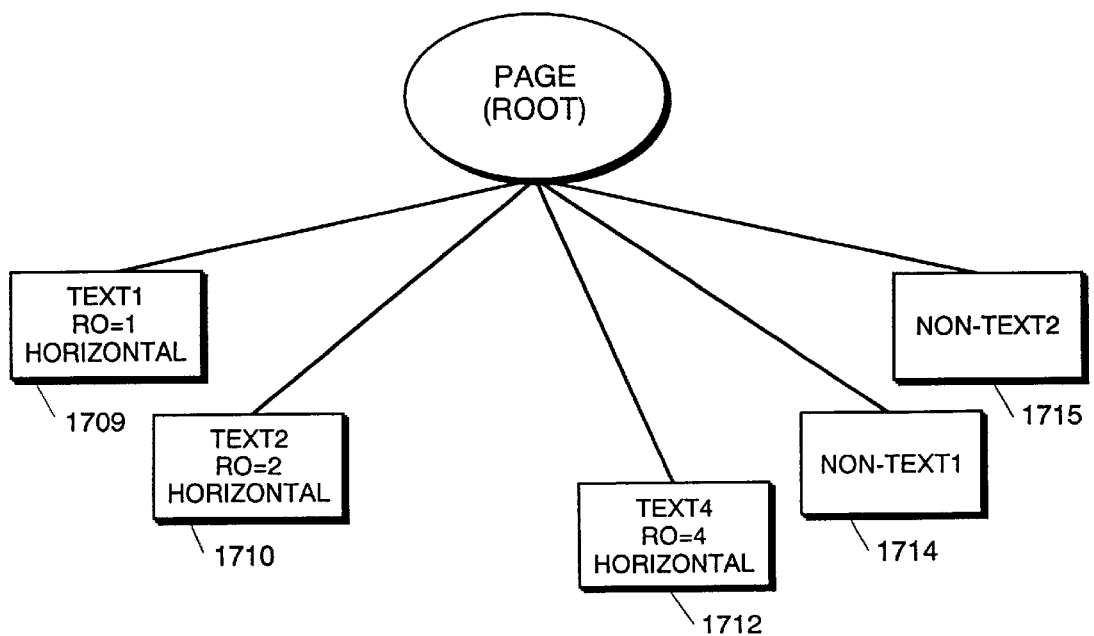

Thus, in step S1601, the user selects the block to be released. In step S1602, the node representing the selected block, as well as any descendants of the node, is deleted from the hierarchical tree structure. For example, as shown in FIGS. 17A, block 1704 has been selected and, as shown in FIG. 18A, the portion of the document image circumscribed by block lines is released. Additionally, node 1711 shown in FIG. 17B is deleted from the hierarchical tree structure in FIG. 18b.

Figure 19A:
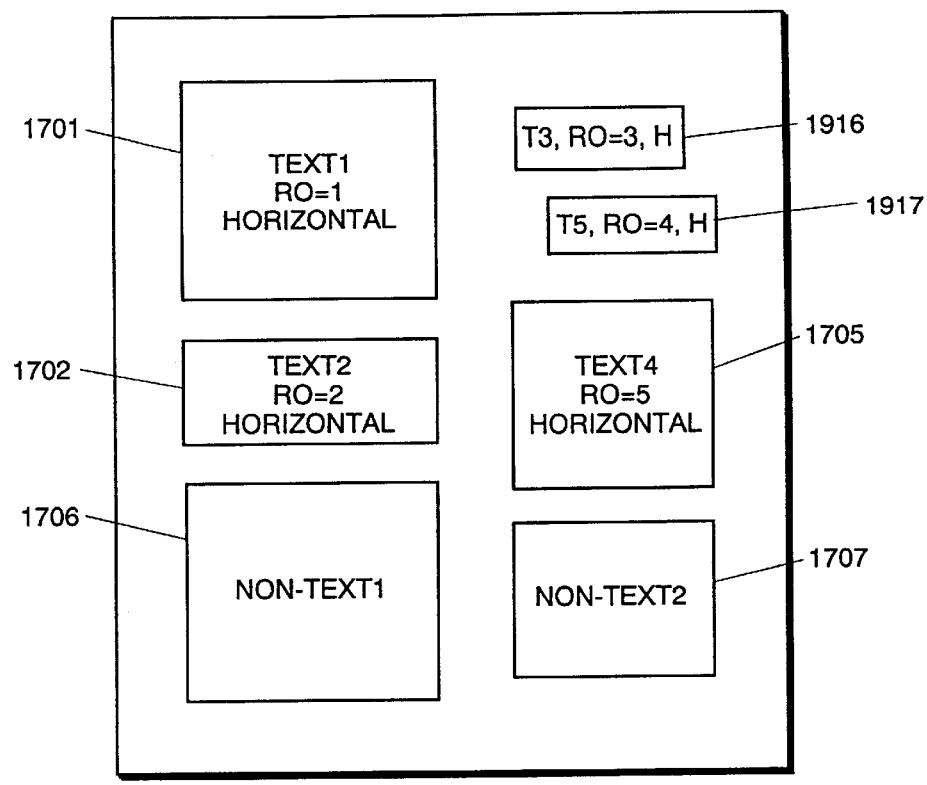
FIGS. 19A and 19B are representational views of a block template of a document image and its corresponding hierarchical tree structure after a block is created in the document image.

In step S1604, the user selects an unblocked portion of the block template of a document image to be blocked. As shown in FIG. 19A, blocks 1916 and 1917 circumscribe the released image data.

In step S1605, nodes 1919 and 1920 are created in the hierarchical tree structure which represent the newly blocked areas. In step S1606, blocks 1916 and 1917 are subjected to various steps of a block selection operation in order to create and to store feature data in corresponding nodes 1919 and 1920.

Figure 19B:
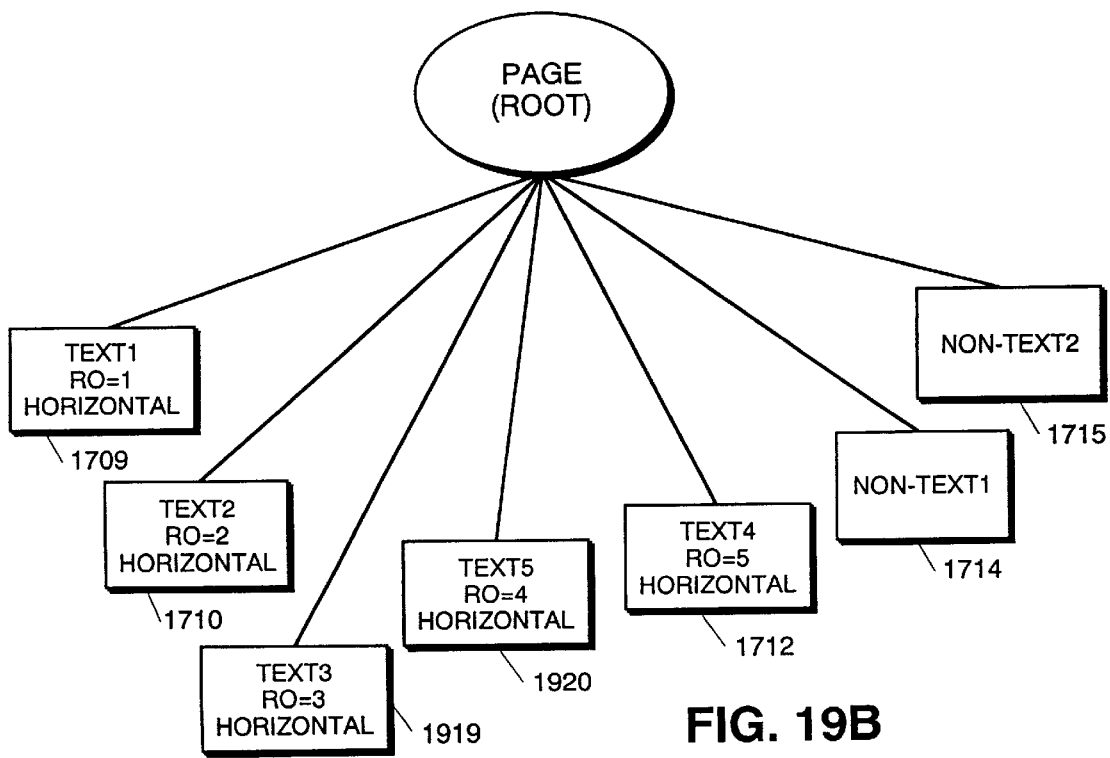

For example, as shown in FIG. 19B, node 1919 has been created to represent block 1916 and node 1920 has been created to represent block 1917. After block selection steps have been applied to blocks 1916 and 1917, feature data is stored in nodes 1919 and 1920 to define each block's characteristics. For example, block 1916 has been defined as text having a reading order of 3 and having a horizontal reading orientation.

In step S1607, it is determined whether the hierarchical tree structure requires further editing in view of the releasing of block 1704 and the creation of blocks 1916 and 1917. If so, in step S1609, the affected blocks are subjected to various steps of a block selection operation so as to update the feature data of each affected block. For example, node 1712 is rearranged based on its edited reading order. And new blocks 1916 and 1917 are arranged in accordance with their new reading order.

In step S1610, the user is queried as to whether any additional editing operations should be performed. If additional editing is required, flow returns to step S304. If not, flow proceeds to step S1611 in which the edited hierarchical tree structure is saved to computer disk 11.

The foregoing method of releasing and creating one or more new blocks can be used to release more than one block so as to create one or more new blocks from the unblocked image areas.

Direct Editing Of The Hierarchical Tree Structure

Figure 20:
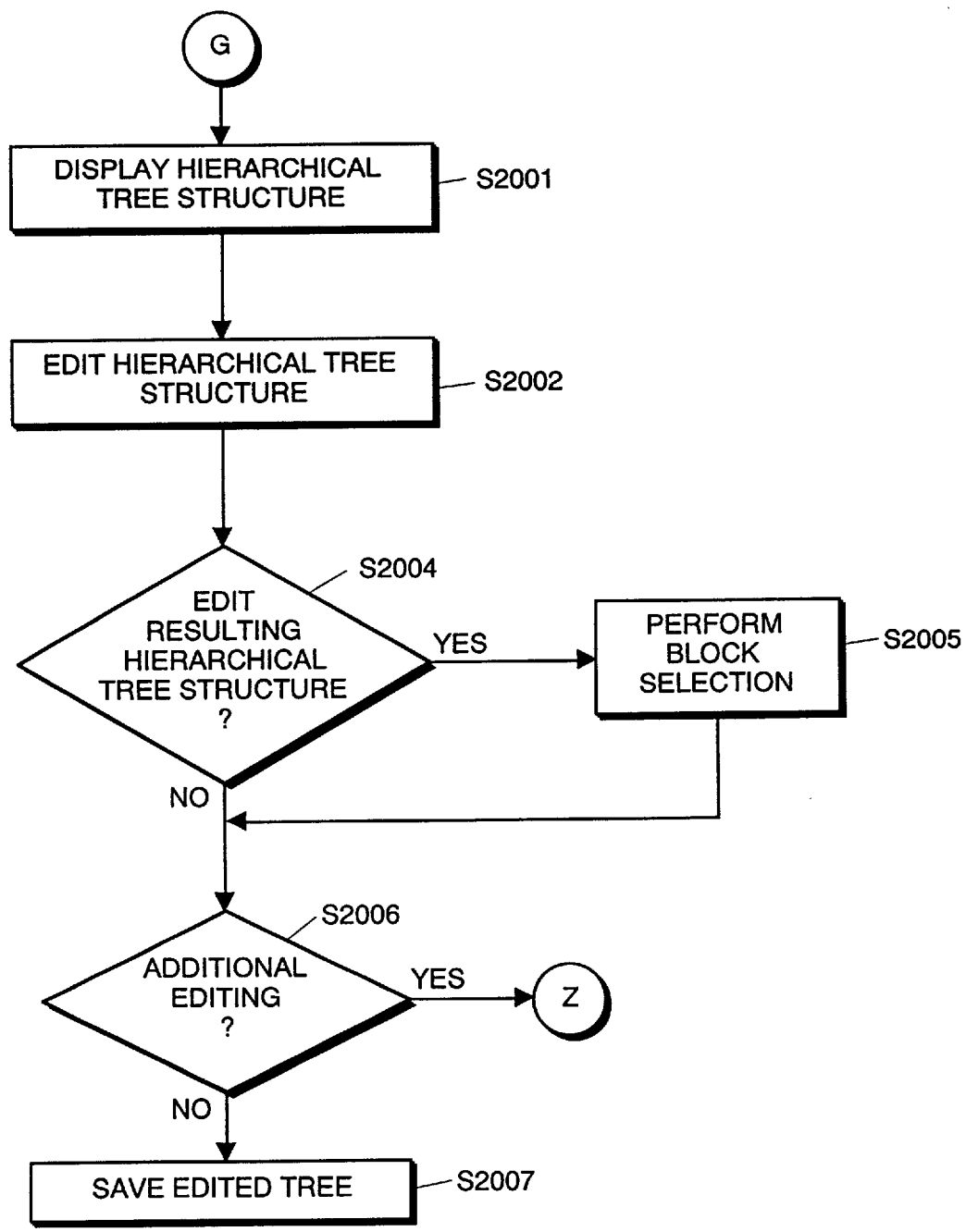
FIG. 20 is a flow diagram describing the method of low-level editing of the hierarchial tree structure.

FIG. 20 is a detailed flow chart showing processing in the event that direct editing of the hierarchical tree structure is selected (step S317). This feature permits advanced users of image processing systems to directly edit the hierarchical tree structure which results from block selection of a document image. As a result, a user can review and edit the hierarchical tree structure directly, without a computer-generated interface.

Thus, in step S2001, the hierarchical tree structure representing the selected block template of a document image is displayed.

In step S2002, a node to be edited is selected and feature data in the node is edited by entering changes via the keyboard. In this manner, either the feature data contained in the nodes of the hierarchical tree structure or the position of the nodes in the hierarchical tree structure can be edited. For example, the feature data contained in a node can be changed from a non-text block to a text block with reading order 4 and horizontal orientation.

In step S2004, it is determined whether the remaining nodes in the hierarchical tree structure require editing. If so, either the user can edit the affected nodes directly or the user can choose to allow the block editing program to do the editing automatically. In the case the user allows the block editing program to perform the editing operation, the affected blocks are subjected to various steps of a block selection operation in step S2005. For example, the nodes will be rearranged to sequentially order the nodes according to the reading orders of the blocks they represent. On the other hand, the user can directly edit each of the affected blocks, and step S2004 can be repeated to determine if any other nodes still require editing.

In step S2006, the user is queried as to whether any additional editing operations should be performed. If additional editing is requested, flow returns to step S304. If not, flow proceeds to step S2007 in which the edited tree structure is saved to computer disk 11.

Editing of the Hierarchial Block Template of the Document Image

Figure 21:
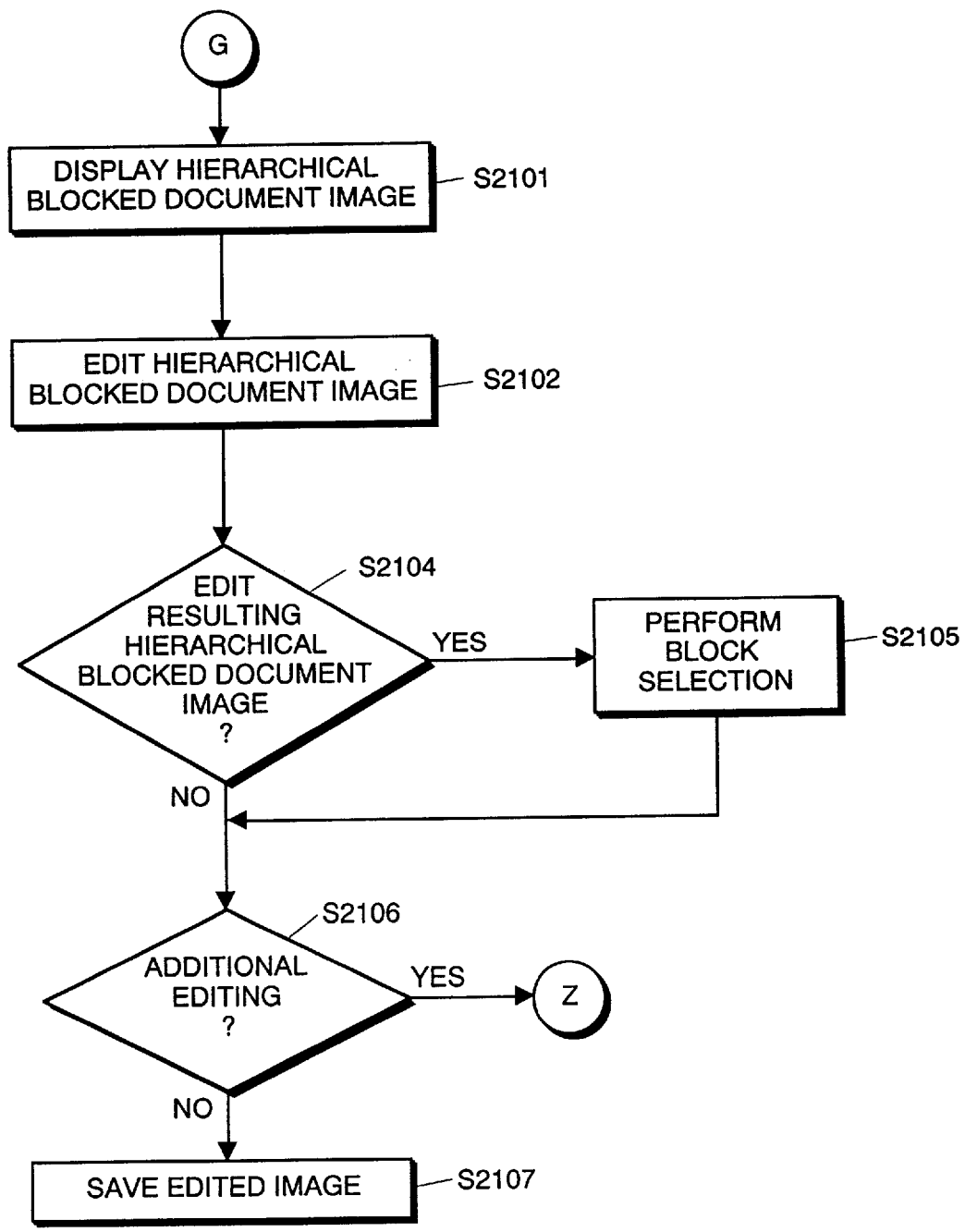
FIG. 21 is a flow diagram describing the method of editing the hierarchial block template of the document image.

FIG. 21 is a detailed flow chart showing processing in the event that editing of the hierarchial block template of the document image is selected (step S318). In this feature, the advanced user of image processing systems can directly edit not only features of blocked image data (as discussed above), but can also edit the hierarchical relationship between blocks of image data without having to modify the hierarchical tree. As a result, hierarchical relationships between blocked image data in the document image can be easily changed and the edited relationship displayed as the hierarchical tree structure is modified.

Figure 22A:
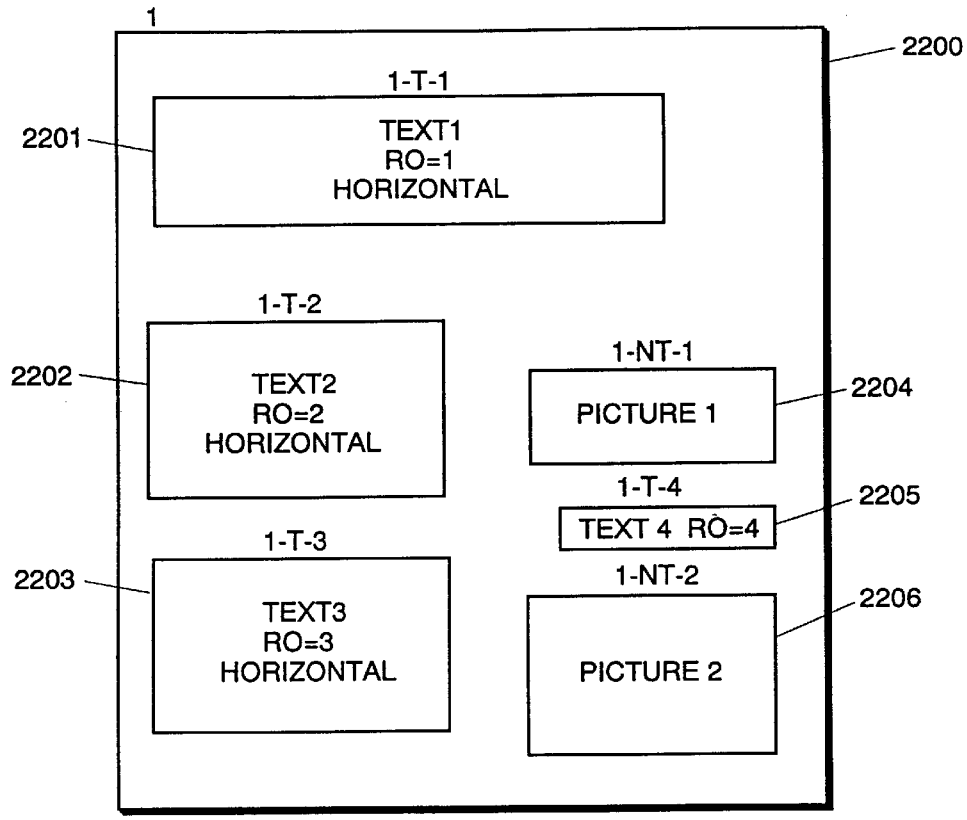
FIGS. 22A and 22B are representational views of a hierarchial block template of a document image and its corresponding hierarchial tree structure prior to editing.
Figure 22B:
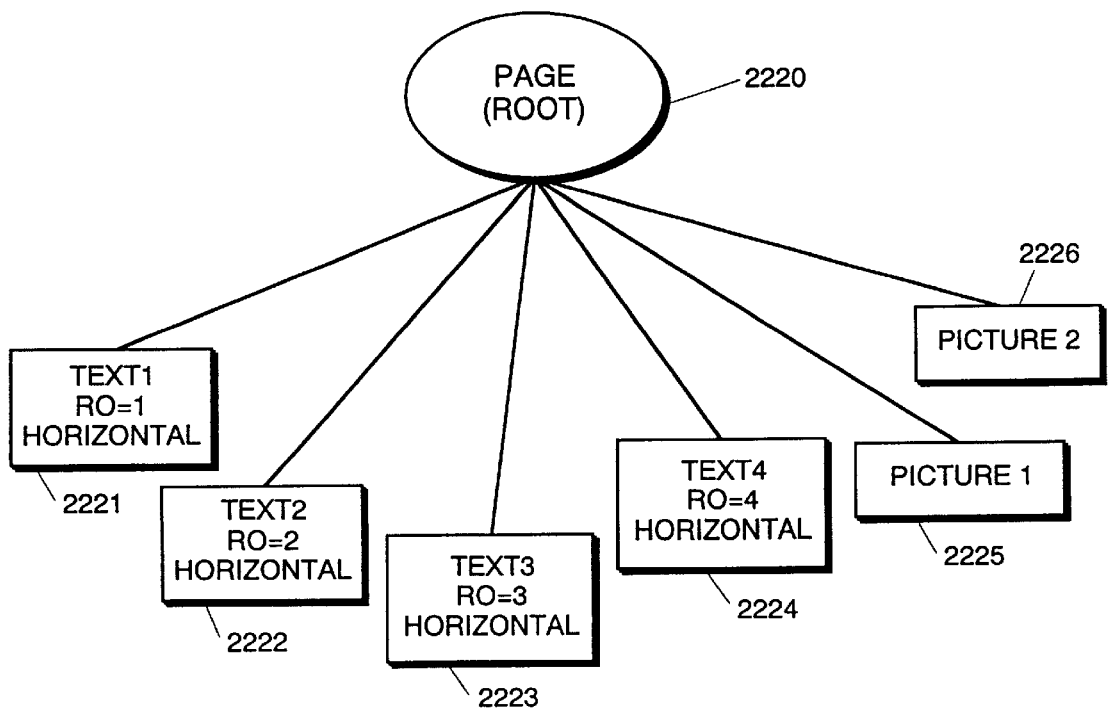

Thus, in step S2101, the hierarchial block template of the document image is generated from the retrieved hierarchical tree structure and is displayed. The displayed hierarchical block template of the document image differs slightly from the block template image discussed previously. Specifically, the hierarchical block template includes hierarchical relationship information displayed at the top portion of each block in the hierarchical block template. The hierarchical relationship information allows the user to readily understand the hierarchical relationship of each block of image data within the document. For example, FIGS. 22A and 22B represent a hierarchial block template of a document image and its corresponding hierarchical tree structure. As shown in FIG. 22A, the hierarchical relationship between text block 2201 and document 2200 is represented in the upper left hand corner of text block 2201 as "1-T-1". This information indicates that text block 2201 is first generation child node 2221, as shown in FIG. 22B, of parent node 2220. The hierarchial relationship for each of the blocks of image data is generated based on the nodal relationship of the hierarchial tree structure shown in FIG. 22B. Thus, for example, picture block 2206 has a hierarchial relationship to the document 2200 and is indicated as "1-NT-2". This information indicates that picture block 2202 is the second child picture node of parent node 2220.

In step S2102, a block of image data in the hierarchial blocked document image is selected and edited. The selected editing operation can be any one of the editing operations discussed previously. For example, the "releasing and creating of a new node" edit operation can be selected. After the edit operation, the feature data contained in the corresponding node representing the edited block is updated in accordance with the edited reading orders. In the case that a hierarchical relationship among blocks of image data has been changed, the hierarchical information displayed on the affected block of image data will be updated as well.

Figure 23A:
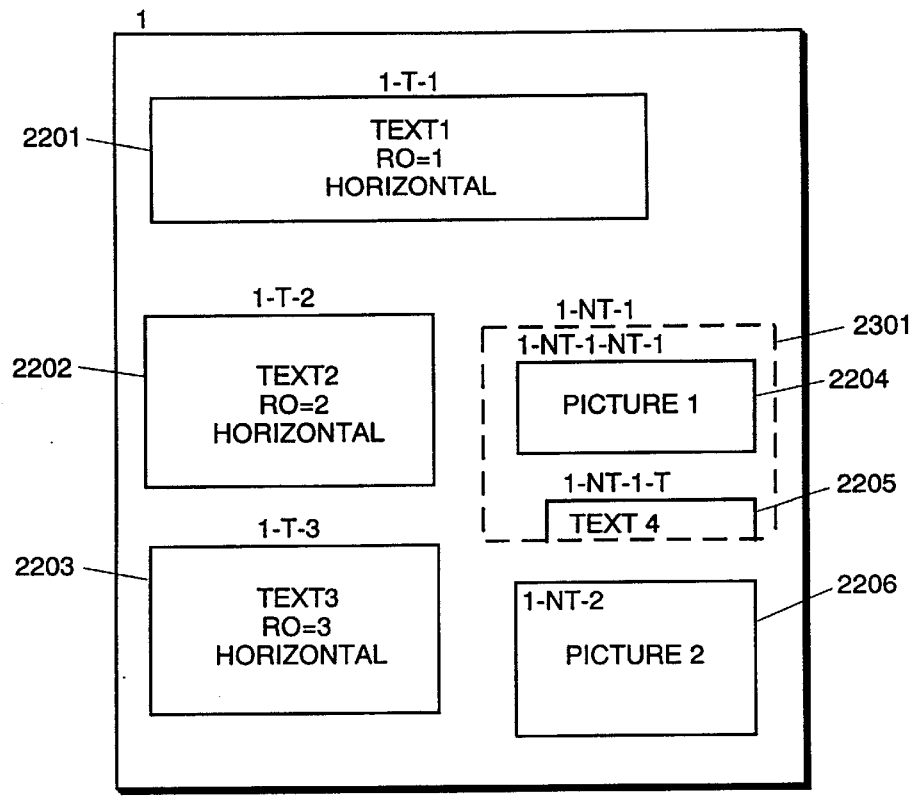
FIGS. 23A and 23B are representational views of the hierarchial block template of the document image corresponding hierarchial tree structure after an editing operation.
Figure 23B:
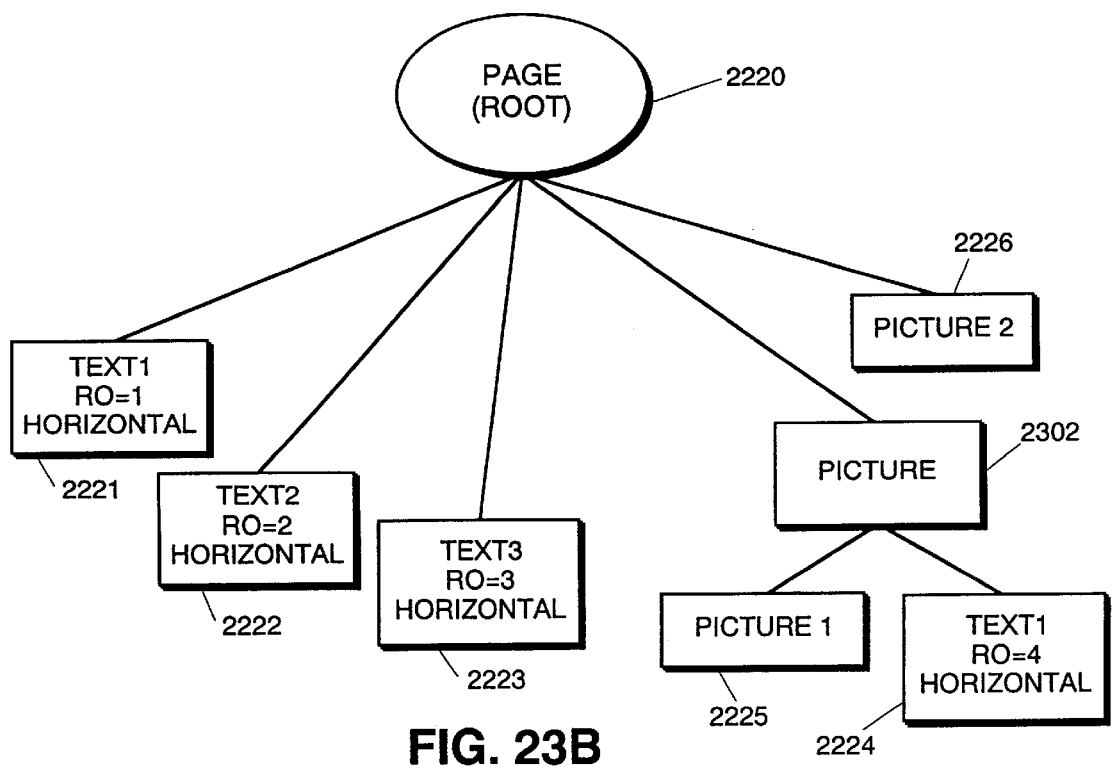
Figure 24:
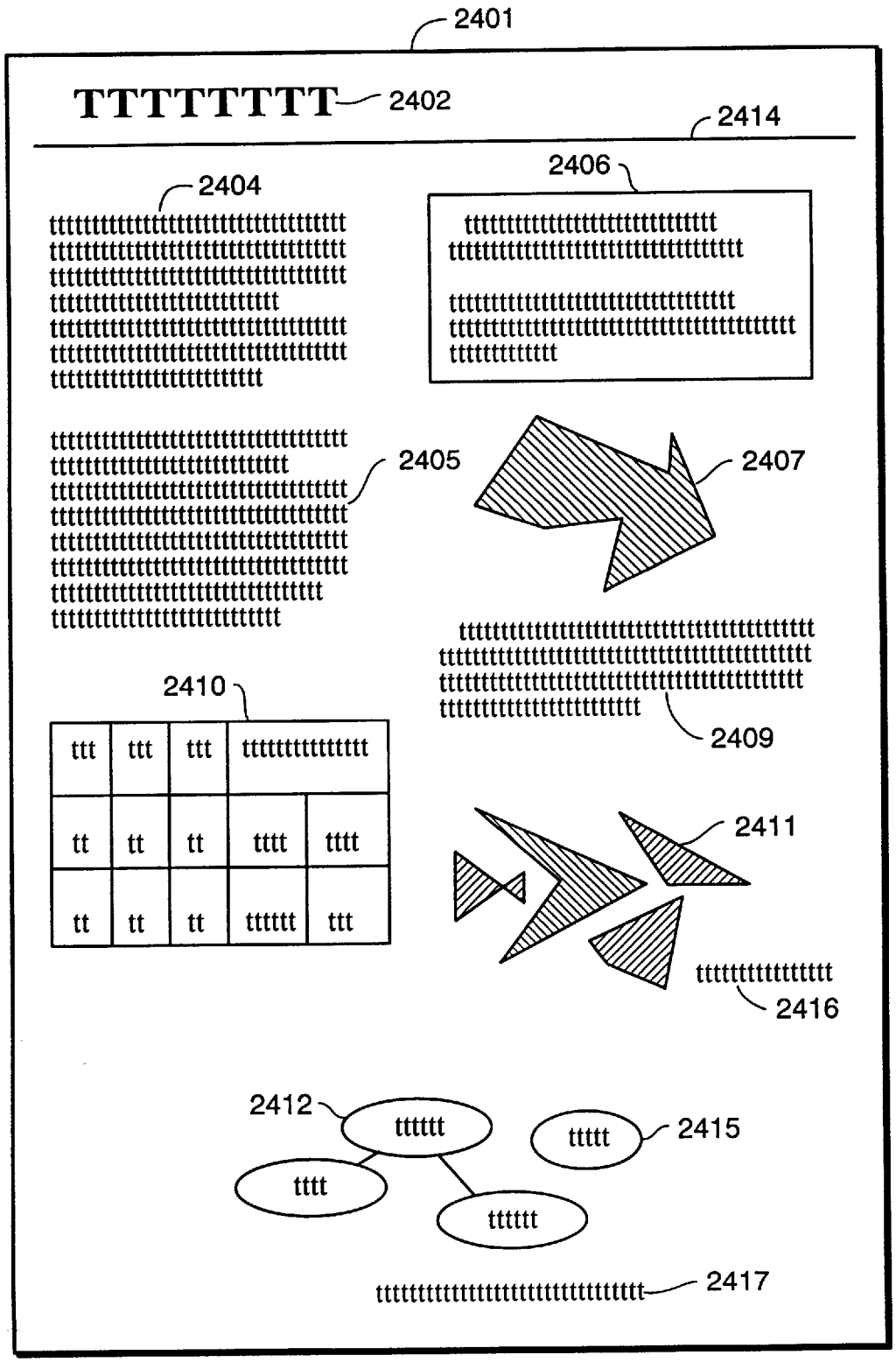
FIG. 24 is a representational view of a document image.
Figure 25:
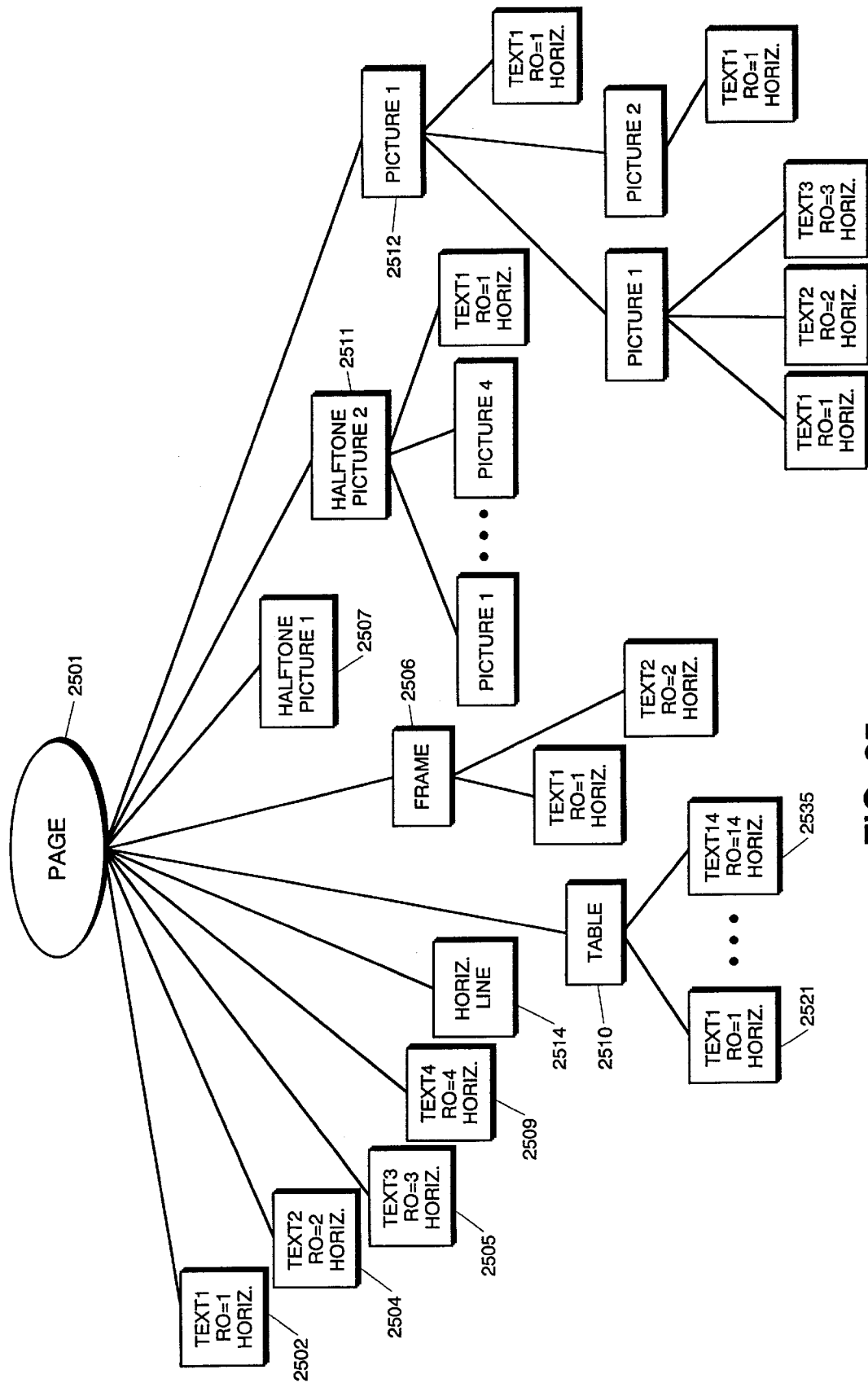
FIG. 25 is a representational view of the hierarchical tree structure which corresponds to the FIG. 24 block template of a document image.
Figure 26:
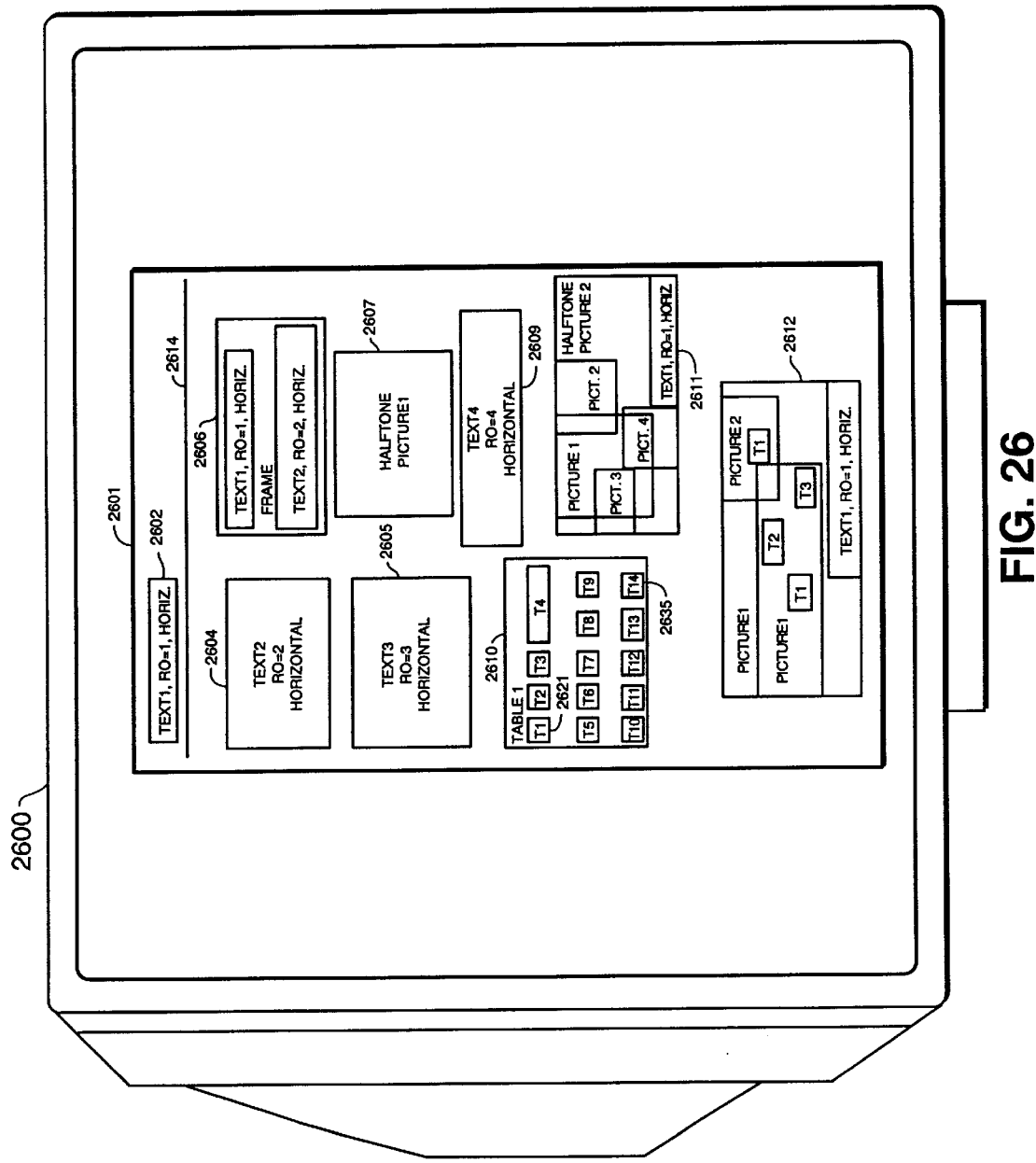
FIG. 26 is a representational view of a document image which has undergone a block selection operation.

As shown in FIG. 23B, the hierarchial relationship of picture block 2204 and text block 2205 has been edited. As shown in FIG. 23A, a new block 2301 circumscribes both picture block 2204 and text block 2205 in a dashed block outline. As a result, the hierarchial tree structure, shown in FIG. 22B, is edited and updated as illustrated in FIG. 23B.

As shown in FIG. 23B, the hierarchial tree structure has been updated to reflect the edited relationship of picture block 2204 and text block 2205. In the present example, corresponding picture node 2225 and corresponding text node 2224 are deleted from the hierarchical tree structure and regenerated to depend from new picture node 2302. In this configuration, picture node 2302 is a child node of page node 2200 and text node 2224 and picture node 2225 are child nodes of picture node 2302. Once the hierarchial tree structure is edited in step 2102, the hierarchial block template is redisplayed as shown in FIG. 23A.

In step S2104, it is determined whether the remaining nodes in the hierarchial tree structure require editing in view of the editing of the hierarchial relationships of blocks 2204 and 2205. If so, in step S2105, the affected blocks of image data, are subjected to various steps of block selection processing so as to update the feature data of each affected block. In the present example shown in FIG. 23B, the only change to the hierarchical block template and corresponding tree is the reading order of text block 2205. The reading order changes from "4" to "1".

In step 2106, the user is queried as to whether any additional editing operations should be performed. If additional editing is requested, flow returns to step S304. If not, flow proceeds to step S2107, in which the edited image is saved to computer disk 11.

What is claimed is:

1. In a block selection system which analyzes a bitmap image representing a page of a document and which produces a hierarchical tree structure corresponding to a block template comprising plural blocks which represent areas of the document page , wherein the hierarchical tree structure includes a plurality of nodes, each of which corresponds to a block in the block template and contains document feature data defining features of document data represented by the block, a method for editing the hierarchical tree structure, the method comprising the steps of:

downloading a hierarchical tree structure from memory;

generating and displaying a block template from the hierarchical tree structure, the block template comprising plural blocks which are displayed at substantially the same positions in the block template as corresponding document data in the document page;

selecting a block to be edited from the displayed block template;

editing a feature of the selected block;

updating document feature data in the node corresponding to the selected block in accordance with an editing operation of a feature of the selected block; and automatically determining whether non-updated document feature data in the corresponding node should be updated based on the feature edited in the editing step, wherein, in the case that a non-updated document feature data should be updated, the non-updated document feature data is automatically updated so as to conform with the edited feature of the selected block of image data.

2. A method according to claim 1, further comprising:

a second determining step for determining whether a feature of at least one other block of image data is affected by the editing of the selected block of image data and, in the case that the at least one feature of the at least one other block of image data in the block template of a document image is affected by the editing of the selected block, document feature data in a node corresponding to the at least one block of image data is updated.

3. In a block selection system which analyzes a bitmap image representing a page of a document and which creates a hierarchical tree structure of a block template comprising plural blocks which represent areas of the document page, wherein the hierarchical tree structure includes a plurality of nodes, each of which corresponds to a block in the block template and contains document feature data defining features of document data represented by the block, a method for selectably editing at least one block, the method comprising the steps of:

selecting a block template which represents a document image, the block template comprising plural blocks which are displayed at substantially the same positions in the block template as corresponding document data in the document page;

selecting an editing operation to be performed on the selected block template;

selecting at least one block from the block template;

performing the selected editing operation on the at least one block;

updating document feature data contained in a node of the hierarchical tree structure corresponding to the at least one edited block; and automatically determining whether non-updated document feature data in the node should be updated in accordance with the updated document feature data, wherein, in the case that a non-updated document feature data should be updated, the non-updated feature data is automatically updated so as to conform with the updated document feature data.

4. A method according to claim 3, further comprising the step of automatically updating at least one other node in the hierarchical tree structure as a result of the edit operation to the at least one block of image data.

5. In a block selection system which analyzes a bitmap image representing a page of a document and which creates a hierarchical tree structure representative of a block template comprising plural blocks which represent areas of the document page , wherein the hierarchical tree structure includes a plurality of nodes, each of which corresponds to a block in the block template and contains document feature data defining features of document data represented by the block, an apparatus for editing the hierarchical tree structure comprising:

a keyboard for inputting user commands;

a memory for storing a hierarchical tree structure and process steps; and a processor for editing the hierarchical tree structure in accordance with the user commands and the stored process steps, wherein the processor executes the stored process steps in response to the user commands so as to (1) download the hierarchical tree structure from memory, (2) generate and display a block template corresponding to the stored hierarchical tree structure, the block template comprising plural blocks which are displayed at substantially the same positions in the block template as corresponding document data in the document sage, (3) select a block to be edited in the displayed block template, (4) edit a feature in the block in accordance with an input editing selection, (5) update document feature data contained in the node corresponding to the selected block of image data, and (6) determine whether non-updated document feature data in the node should be updated in accordance with the updated document feature data wherein, in a case where it is determined that a non-updated document feature data should be updated, the non-updated feature data is automatically updated so as to correspond to the edited feature of the selected block.

6. In an apparatus according to claim 5, wherein the processor executes stored process steps in order to determine whether a feature of at least one other block of image data is affected by the editing of document the selected block of image data and, in the case it has been determined the feature of the at least one block of image data has been affected, document feature data in a node corresponding to the at least one block of image data is updated.

7. In a block selection system which analyzes a bitmap image representing a page of a document and which creates a hierarchical tree structure representative of a block template comprising plural blocks which represent areas of the document page , wherein the hierarchical tree structure includes a plurality of nodes, each of which corresponds to a block in the block template and contains document feature data defining features of document data represented by the block, an apparatus for editing the hierarchical tree structure comprising:

input means for inputting user commands;

memory means for storing a hierarchial tree structure and process steps; and processor means for editing the hierarchical tree structure in accordance with the user commands and the stored process steps, wherein the processor means executes the stored process steps in response to the user commands so as to (1) download the hierarchical tree structure from the memory means, (2) generate and display a block template corresponding to the stored hierarchical tree structure, the block template comprising plural blocks which are displayed at substantially the same positions in the block template as corresponding document data in the document page , (3) select a block to be edited in the displayed block template of a document image, (4) edit a feature in the block in accordance with an input editing selection, (5) update document feature data contained in a node corresponding to the selected block of image data, and (6) determine whether non-updated document feature data in the node should be updated in accordance with the updated document feature data wherein, in a case where it is determined that a non-updated document feature data should be updated, the non-updated feature data is automatically updated so as to correspond to the edited feature of the selected block.

8. In an apparatus according to claim 7, wherein the processor means executes stored process steps in order to determine whether a feature of at least one other block of image data is affected by the editing means of the selected block of image data and, in the case it has been determined the feature of the at least one block of image data has been affected, feature data in a node corresponding to the at least one block of image data is updated.

9. In a block selection system which analyzes a bitmap image representing a page of a document and which creates a hierarchical tree structure corresponding to a block template comprising plural blocks which represent areas of the document page , wherein the hierarchical tree structure includes a plurality of nodes, each of which corresponds to a block in the block template and contains document feature data defining features of document data represented by the block, a method for editing an attribute document feature of the block, the method comprising the steps of:

retrieving a hierarchical tree structure from memory;

generating and displaying a block template corresponding to the hierarchical tree structure, the block template comprising plural blocks which are displayed at substantially the same positions in the block template as corresponding document data in the document pace ;

selecting a block to be edited from the displayed block template;

selecting an attribute feature for the selected block;

updating document feature data defining the attribute feature in a node corresponding to the selected block so as to conform to the selected attribute feature; and automatically determining whether non-updated document feature data in the corresponding node should be updated based on the document feature data updated in the updating step, wherein, in the case that a non-updated document feature data should be updated, the non-updated document feature data is automatically updated so as to conform with the updated document feature data.

10. In a block selection system which creates a hierarchical tree structure represented in a block template of a document image, wherein the hierarchical tree structure includes a plurality of nodes, each of which represents a block of image data in the block template of a document image and contains feature data defining features of the block of image data, a method for editing a reading order feature of a block of text data, the method comprising the steps of:

retrieving a hierarchical tree structure from memory;

generating and displaying a block template of a document image corresponding to the stored hierarchical tree structure;

selecting a block of text data within the block template of a document image to be edited;

displaying a menu containing a numerical reading order of each block of text data in the block template of a document image;

selecting a new numerical reading order for the selected block of text data;

editing the feature data defining the reading order feature in a node corresponding to the selected block of text data; and updating feature data in each node corresponding to blocks of image data which are affected by the edit of the reading order feature of the selected block of image data.

11. In a block selection system which creates a hierarchical tree structure represented in a block template of a document image, wherein the hierarchical tree structure includes a plurality of nodes, each of which represents a block of image data in the block template of a document image and contains feature data defining features of the block of image data, a method for editing a reading orientation feature of a block of text data, the method comprising the steps of:

retrieving a hierarchical tree structure from memory;

generating and displaying a block template of a document image corresponding to the stored hierarchical tree structure;

selecting a block of text data within the block template of a document image to be edited;

displaying a menu containing at least two selectable reading orientation features;

selecting one of the at least two reading orientation features;

editing the feature data defining the reading orientation feature in a node corresponding to the selected block of image data; and updating remaining feature data in the node and each node corresponding to blocks of image data which are affected by the edit of the reading orientation of the selected block of text data.

12. In a block selection system which analyzes a bitmap image representing a page of a document and which creates a hierarchical tree structure representative of a block template comprising plural blocks which represent areas of the document page , wherein the hierarchical tree structure includes a plurality of nodes, each of which corresponds to a block within the block template and contains document feature data defining features of document data represented by the block, a method of combining two blocks of document image data within the block template, the method comprising the steps of:

retrieving a hierarchical tree structure from memory;

generating and displaying a block template corresponding to the hierarchical tree structure, the block template comprising plural blocks which are displayed at substantially the same positions in the block template as corresponding document data within the document page;

selecting at least two blocks to be merged together into a new block;

deleting each node corresponding to the selected blocks;

re-displaying the block template having the selected blocks merged into the new block;

subjecting the new block to block selection so as to create a corresponding node in the hierarchical tree structure and so as to store document feature data in the created node; and automatically determining whether non-updated document feature data in at least one other node should be updated based on the stored document feature data, wherein, in the case that a non-updated document feature data should be updated, the non-updated document feature data is automatically updated so as to conform with the stored document feature data.

13. In a block selection system which analyzes a bitmap image representing a page of a document and which creates a hierarchical tree structure corresponding to a block template comprising plural blocks which represent areas of the document page , wherein the hierarchical tree structure includes a plurality of nodes, each of which corresponds to a block in the block template and contains document feature data defining features of document data represented by the block, a method for releasing image data from within a block and creating one or more blocks from the released image data, the method comprising the steps of:

retrieving a hierarchical tree structure from memory;

generating and displaying a block template corresponding to the hierarchical tree structure, the block template comprising plural blocks which are displayed at substantially the same positions in the block template as corresponding document data within the document page;

selecting a block within the block template;

releasing image data represented by the selected block;

deleting a node of the hierarchical tree structure corresponding to the selected block;

creating one or more blocks representing the released image data;

performing a block selection operation on the one or more blocks so as to create a node and document feature data corresponding to each of the one or more blocks; and automatically determining whether non-updated document feature data in at least one other node should be updated based on the created document feature data, wherein, in the case that a non-updated document feature data should be updated, the non-updated document feature data is automatically updated so as to conform with the created document feature data.

14. In a block selection system which analyzes a bitmap image representing a page of a document and which creates a hierarchical tree structure corresponding to a block template comprising plural blocks which represent areas of the document page, wherein the hierarchical tree structure includes a plurality of nodes, each of which corresponds to a block in the block template and contains document feature data defining features of document data represented by the block, a method for directly editing the hierarchical tree structure, the method comprising the steps of:

retrieving a hierarchical tree structure from memory;

selecting a node in the hierarchical tree structure to edit;

editing document feature data in the selected node; automatically updating unedited document feature data in the node to conform with the edited document feature data; and automatically updating document feature data in at least one other node in the hierarchical tree structure in a case where the edited document feature data in the selected node affects the document feature data in the at least one other node.

15. In a block selection system which analyzes a bitmap image representing a page of a document and which creates a hierarchical tree structure corresponding to a hierarchical block template comprising plural blocks which represent areas of the document page, wherein the hierarchical tree structure includes a plurality of nodes, each of which corresponds to a block in the block template and contains document feature data defining features of data represented by the block, a method for generating a hierarchical block template and for selectably editing at least one block in the hierarchical block template, the method comprising the steps of:

retrieving a hierarchical tree structure from memory;

generating and displaying a hierarchical block template based on the retrieved hierarchical tree structure, said displayed hierarchical block template comprising plural blocks which are displayed at substantially the same positions in a block template as corresponding document data in the document page and which display information which indicates at least image data type and a hierarchical relationship of each block within the hierarchical block template;

selecting an editing operation to be performed on the hierarchical block template;

selecting a block to be edited within the hierarchical block template;

performing the selected editing operation on the selected block;

updating document feature data contained in a node of the hierarchical tree structure corresponding to the edited block; and automatically updating document feature data contained in at least one other node of the hierarchical tree structure in accordance with the updated document feature data.

16. In a block selection system which analyzes a bitmap image representing a page of a document and which creates a hierarchical tree structure corresponding to a block template comprising plural blocks which represent areas of the document page, wherein the hierarchical tree structure includes a plurality of nodes, each of which corresponds to a block within the block template and contains document feature data defining features of document data represented by the block, a method for splitting a block into one or more blocks, the method comprising the steps of:

retrieving a hierarchical tree structure from memory;

generating and displaying a block template corresponding to the hierarchical tree structure, the block template comprising plural blocks which are displayed at substantially the same positions in the block template as corresponding document data within the document page;

selecting a block to be split into at least two blocks;

designating a portion to be split from the selected block;

splitting the block into at least two blocks in accordance with the designated portion;

deleting a node in the hierarchical tree structure corresponding to the selected block;

re-displaying the block template having the selected block split into at least two blocks of image data;

subjecting the at least two blocks to block selection so as to create corresponding nodes in the hierarchical tree structure and to store document feature data in the created nodes; and automatically determining whether non-updated document feature data in at least one other node should be updated based on the stored document feature data, wherein, in a case where non-updated document feature data should be updated, the non-updated document feature data is automatically updated so as to conform with the stored document feature data.

17. For use in a block selection system which analyzes a bitmap image representing a page of a document and which produces a hierarchical tree structure corresponding to a block template comprising plural blocks which represent areas of the document page, wherein the hierarchical tree structure includes a plurality of nodes, each of which corresponds to a block in the block template and contains document feature data defining features of document data represented by the block, a computer-readable medium storing computer-executable process steps, the process steps comprising the steps of:

a downloading step for downloading a hierarchical tree structure from memory;

a generating and displaying step for generating and displaying a block template from the hierarchical tree structure, the block template comprising plural blocks which are displayed at substantially the same position in the block template as corresponding document data in the document page;

a selecting step for selecting a block to be edited from the displayed block template;

an editing step for editing a feature of the selected block;

an updating step for updating document feature data in a node corresponding to the selected block in accordance with an editing operation of a feature of the selected block; and a determining step for automatically determining whether non-updated document feature data in the corresponding node should be updated based on the document feature data updated in the updating step, wherein, in a case where a non-updated document feature data should be updated, the non-updated document feature data is automatically updated so as to conform with the edited feature of the selected block of image data.

18. For use in a block selection system which analyzes a bitmap image representing a page of a document and which creates a hierarchical tree structure of a block template comprising plural blocks which represent areas of the document page, wherein the hierarchical tree structure includes a plurality of nodes, each of which corresponds to a block in the block template and contains document feature data defining features of document data represented by the block, a computer-readable medium storing computer-executable process steps, the process steps comprising the steps of:

- a selecting step for selecting a block template which represents a document image, the block template comprising plural blocks which are displayed at substantially the same positions in the block template as corresponding document data in the document page;
- a selecting step for selecting an editing operation to be performed on the selected block template;
- a selecting step for selecting a block from the block template;
- a performing step for performing the selected editing operation on the selected block;
- an updating step for updating document feature data contained in a node of the hierarchical tree structure corresponding to the selected block; and
- a determining step for automatically determining whether a non-updated document feature data in the node should be updated in accordance with the updated document feature data, wherein in a case where a non-updated document feature data should be updated, the non-updated feature data is automatically updated so as to conform with the updated document feature data.

19. For use in a block selection system which analyzes a bitmap image representing a page of a document and which creates a hierarchical tree structure corresponding to a block template comprising plural blocks which represent areas of the document page, wherein the hierarchical tree structure includes a plurality of nodes, each of which corresponds to a block in the block template and contains document feature data defining features of document data represented by the block, a computer-readable medium storing computer-executable process steps, the process steps comprising the steps of:

- a retrieving step for retrieving a hierarchical tree structure from memory;
- a generating and displaying step for generating and displaying a block template corresponding to the hierarchical tree structure, the block template comprising plural blocks which are displayed at substantially the same positions in the block template as corresponding document data in the document page;
- a selecting step for selecting a block to be edited from the displayed block template;
- a selecting step for selecting an attribute feature for the selected block;
- an updating step for updating document feature data defining the attribute feature in a node corresponding to the selected block so as to conform to the selected attribute feature; and
- a determining step for automatically determining whether a non-updated document feature data in the corresponding node should be updated based on the document feature data updated in the updating step, wherein, in a case where non-updated document feature data should be updated, the non-updated document feature data is automatically updated so as to conform with the updated document feature data.

20. For use in a block selection system which creates a hierarchical tree structure represented in a block template of a document image, wherein the hierarchical tree structure includes a plurality of nodes, each of which represents a block of image data in the block template of a document image and contains feature data defining features of the block of image data, a method for editing a reading order feature of a block of text data, the method comprising the steps of:

- a retrieving step for retrieving a hierarchical tree structure from memory;
- a generating and displaying step for generating and displaying a block template of a document image corresponding to the stored hierarchical tree structure;
- a selecting step for selecting a block of text data within the block template of a document image to be edited;
- a displaying step for displaying a menu containing a numerical reading order of each block of text data in the block template of a document image;
- a selecting step for selecting a new numerical reading order for the selected block of text data;
- an editing step for editing the feature data defining the reading order feature in a node corresponding to the selected block of text data; and
- an updating step for updating feature data in each node corresponding to blocks of image data which are affected by the edit of the reading order feature of the selected block of image data.

21. For use in a block selection system which creates a hierarchical tree structure represented in a block template of a document image, wherein the hierarchical tree structure includes a plurality of nodes, each of which represents a block of image data in the block template of a document image and contains feature data defining features of the block of image data, a computer-readable medium storing computer-executable process steps, the process steps comprising the steps of:

- a retrieving step for retrieving a hierarchical tree structure from memory;
- a generating step for generating and displaying a block template of a document image corresponding to the stored hierarchical tree structure;
- a selecting step for selecting a block of text data within the block template of a document image to be edited;
- a displaying step for displaying a menu containing at lease two selectable reading orientation features;
- a selecting step for selecting one of the at least two reading orientation features;
- an editing step for editing the feature data defining the reading orientation feature in a node corresponding to the selected block of image data; and
- an updating step for updating remaining feature data in the node and each node corresponding to blocks of image data which are affected by the edit of the reading orientation of the selected block of text data.

22. For use in a block selection system which analyzes a bitmap image representing a page of a document and which creates a hierarchical tree structure representative of a block template comprising plural blocks which represent areas of the document page, wherein the hierarchical tree structure includes a plurality of nodes, each of which corresponds to a block within the block template and contains document feature data defining features of document data represented by the block, a computer-readable medium storing computer-executable process steps, the process steps comprising the steps of:

- a retrieving step for retrieving a hierarchical tree structure from memory;

a generating and displaying step for generating and displaying a block template corresponding to the hierarchical tree structure, the block template comprising plural blocks which are displayed at substantially the same position in the block template as corresponding document data within the document page;

a selecting step for selecting at least two blocks to be merged together into a new block;

a deleting step for deleting each node corresponding to the selected blocks;

a re-displaying step for re-displaying the block template having the selected blocks merged into a new block;

a subjecting step for subjecting the new block to block selection so as to create a corresponding node in the hierarchical tree structure and so as to store document feature data in the created node; and a determining step for automatically determining whether a non-updated document feature data in at least one other node should be updated based on the stored document feature data, wherein, in the case that the non-updated document feature data should be updated, the non-updated document feature data is automatically updated so as to conform with the stored document feature data.

23. For use in a block selection system which analyzes a bitmap image representing a pace of a document and which creates a hierarchical tree structure corresponding to a block template comprising plural blocks which represent areas of the document page , wherein the hierarchical tree structure includes a plurality of nodes, each of which corresponds to a block in the block template and contains document feature data defining features of document data represented by the block, a computer-readable medium storing computer-executable process steps, the process steps comprising the steps of:

a retrieving step for retrieving a hierarchical tree structure from memory;

a generating and displaying step for generating and displaying a block template corresponding to the hierarchical tree structure, the block template comprising plural blocks which are displayed at substantially the same positions in the block template as corresponding document data within the document page;

a selecting step for selecting a block from the block template;

a releasing step for releasing image data represented by the selected block;

a deleting step for deleting a node corresponding to the selected block;

a creating step for creating one or more blocks representing the released image data;

a performing step for performing a block selection operation on the one or more blocks so as to create a node and document feature data corresponding to each of the one or more blocks; and a determining step for automatically determining whether non-updated document feature data in at least one other node should be updated based on the created document feature data, wherein, in a case that non-updated document feature data should be updated, the non-updated document feature data is automatically updated so as to conform with the created document feature data.

24. For use in a block selection system which analyzes a bitmap image representing a page of a document and which creates a hierarchical tree structure corresponding to a block template comprising plural blocks which represent areas of the document page , wherein the hierarchical tree structure includes a plurality of nodes, each of which corresponds to a block in the block template and contains document feature data defining features of document data represented by the block, a computer-readable medium storing computer-executable process steps, the process steps comprising the steps of:

a retrieving step for retrieving a hierarchical tree structure from memory;

a selecting step for selecting a node in the hierarchical tree structure to edit;

an editing step for editing document feature data in the selected node;

an updating step for automatically updating unedited document feature data in the node so as to conform with the edited document feature data; and an updating step for automatically updating document feature data in at least one other node in the hierarchical tree structure in a case where the edited document feature data in the selected node affects the document feature data in the at least one other node.

25. For use in a block selection system which analyzes a bitmap image representing a page of a document and which creates a hierarchical tree structure corresponding to a hierarchical block template comprising plural blocks which represent areas of the document page , wherein the hierarchical tree structure includes a plurality of nodes, each of which corresponds to a block in the block template and contains document feature data defining features of document data represented by the block, a computer-readable medium storing computer-executable process steps, the process steps comprising the steps of:

a retrieving step for retrieving a hierarchical tree structure from memory;

a generating and displaying step for generating and displaying a hierarchical block template based on the retrieved hierarchical tree structure, said displayed hierarchical block template comprising plural blocks which are displayed at substantially the same positions in the block template as corresponding document data in the document page and which display information for each block of image data which indicates at least image data type and a hierarchical relationship of each block within the hierarchical block template;

a selecting step for selecting an editing operation to be performed on the hierarchical block template;

a selecting step for selecting a block to be edited within the block template;

a performing step for performing the selected editing operation on the selected block;

an updating step for updating document feature data contained in a node of the hierarchical tree structure corresponding to the selected block; and an updating means for automatically updating document feature data contained in the node of the hierarchical tree structure in accordance with the updated document feature data.

26. For use in a block selection system which analyzes a bitmap image representing a page of a document and which creates a hierarchical tree structure corresponding to a block template comprising plural blocks which represent areas of the document page , wherein the hierarchical tree structure includes a plurality of nodes, each of which corresponds to a block within the block template and contains document feature data defining features of document data represented by the block, a computer-readable medium storing computer-executable process steps, the process steps comprising the steps of:

- a retrieving step for retrieving a hierarchical tree structure from memory;
- a generating and displaying step for generating and displaying a block template corresponding to the stored hierarchical tree structure, the block template comprising plural blocks which are displayed at substantially the same positions in the block template as corresponding document data within the document page;
- a selecting step for selecting a block to be split into at least two blocks;
- a designating step for designating a portion to be split from the selected block;
- a splitting step for splitting the block into at least two blocks in accordance with the designated portion;
- a deleting step for deleting a node in the hierarchical tree structure corresponding to the selected block;
- a re-displaying step for re-displaying the block template having the selected block split into at least two blocks;
- a subjecting step for subjecting the at least two blocks to block selection so as to create corresponding nodes in the hierarchical tree structure and to store document feature data in the created nodes; and
- a determining step for automatically determining whether non-updated document feature data in at least one other node should be updated based on the stored document feature data, wherein, in a case where non-updated document feature data should be updated, the non-updated document feature data is automatically updated so as to conform with the stored document feature data.

* * * * *

UNITED STATES PATENT AND TRADEMARK OFFICE
CERTIFICATE OF CORRECTION

PATENT NO. : 5,825,944  Page 1 of 2

DATED : October 20, 1998

INVENTOR : SHIN-YWAN WANG

It is certified that error appears in the above-identified patent and that said Letters Patent is hereby corrected as shown below:

<u>COLUMN 15</u>

Line 44, "sage," should read --page,--.

Line 59, "of image" should read --of document image--.

Line 60, delete "document".

<u>COLUMN 16</u>

Line 38, delete "means".

Line 41, "affected," should read --affected, document--.

Line 58, "pace ;" should read --page;--.

UNITED STATES PATENT AND TRADEMARK OFFICE
CERTIFICATE OF CORRECTION

PATENT NO. : 5,825,944                  Page 2 of 2

DATED         : October 20, 1998

INVENTOR    : SHIN-YWAN WANG

It is certified that error appears in the above-identified patent and that said Letters Patent is hereby corrected as shown below:

COLUMN 19

Line 27, "of" should read --of document--.

COLUMN 23

Line 26, "pace" should read --page--.

Signed and Sealed this

Seventh Day of September, 1999

Attest:

Q. TODD DICKINSON

*Attesting Officer*        *Acting Commissioner of Patents and Trademarks*